(12) United States Patent
Jati et al.

(10) Patent No.: US 10,964,191 B2
(45) Date of Patent: Mar. 30, 2021

(54) PERSONAL SAFETY DEVICE AND OPERATING METHOD THEREFOR

(71) Applicant: SAMSUNG ELECTRONICS CO., LTD., Suwon-si (KR)

(72) Inventors: Gilang Kusuma Jati, Jakarta (ID); Agus Kurniawan, Jakarta (ID); Fajri Fajri, Jakarta (ID)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 16/470,405

(22) PCT Filed: Dec. 19, 2017

(86) PCT No.: PCT/KR2017/014990
§ 371 (c)(1),
(2) Date: Jun. 17, 2019

(87) PCT Pub. No.: WO2018/124584
PCT Pub. Date: Jul. 5, 2018

(65) Prior Publication Data
US 2020/0082699 A1    Mar. 12, 2020

(30) Foreign Application Priority Data

Dec. 28, 2016  (ID) .............................. P00201609071

(51) Int. Cl.
*G08B 21/04*    (2006.01)
*H04W 4/021*    (2018.01)
(Continued)

(52) U.S. Cl.
CPC .... *G08B 21/0469* (2013.01); *H04M 1/72454* (2021.01); *H04W 4/021* (2013.01);
(Continued)

(58) Field of Classification Search
CPC .... G08B 21/02; G08B 21/0469; G08B 21/18; G08B 25/14; G08B 3/10; G08B 5/22;
(Continued)

(56) References Cited

U.S. PATENT DOCUMENTS 10,121,075 B2   11/2018  Du et al.
2015/0243150 A1  8/2015  Kang et al.
(Continued)

FOREIGN PATENT DOCUMENTS

KR   10-2016-0054397 A   5/2016
KR   10-2016-0066813 A   6/2016
(Continued)

OTHER PUBLICATIONS

International Search Report (PCT/ISA/210) dated Mar. 26, 2018 issued by the International Searching Authority in counterpart International Patent Application No. PCT/KR2017/014990.
(Continued)

*Primary Examiner* — Omeed Alizada
(74) *Attorney, Agent, or Firm* — Sughrue Mion, PLLC

(57) ABSTRACT

Provided are a personal safety device and an operating method of the same according to embodiments. The personal safety device includes a communication interface; a memory storing at least one instruction; and a processor configured to execute the at least one instruction to obtain at least one of a user's personal environment information or surrounding environment information, identify an action to be performed for the user, based on the obtained at least one of the personal environment information or the surrounding environment information, identify a device to perform the identified action, based on the obtained at least one of personal environment information or surrounding environment information, and perform the determined action by using the identified device.

12 Claims, 35 Drawing Sheets

(51) Int. Cl.
  *H04M 1/72454* (2021.01)
  *G08B 3/10* (2006.01)
  *G08B 5/22* (2006.01)
  *H04L 29/08* (2006.01)

(52) U.S. Cl.
  CPC .................. *G08B 3/10* (2013.01); *G08B 5/22* (2013.01); *H04L 67/125* (2013.01)

(58) Field of Classification Search
  CPC . H04L 67/125; H04M 1/72569; H04W 4/021; H04W 4/027; H04W 4/21; H04W 4/80; H04W 4/90
  See application file for complete search history.

(56) References Cited

U.S. PATENT DOCUMENTS

| | | |
|---|---|---|
| 2015/0348389 A1 | 12/2015 | Jang et al. |
| 2016/0063874 A1 | 3/2016 | Czerwinski et al. |
| 2016/0287142 A1* | 10/2016 | Han .................... A61B 5/1116 |

FOREIGN PATENT DOCUMENTS

| | | |
|---|---|---|
| KR | 10-2016-0119612 A | 10/2016 |
| KR | 10-2016-0144193 A | 12/2016 |

OTHER PUBLICATIONS

Written Opinion (PCT/ISA/237) dated Mar. 26, 2018 issued by the International Searching Authority in counterpart International Patent Application No. PCT/KR2017/014990.

* cited by examiner

FIG. 29
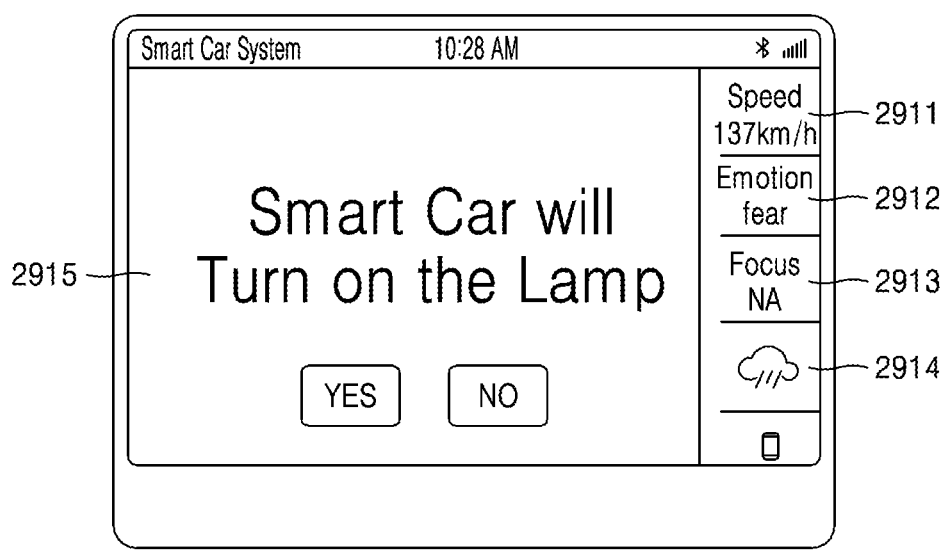
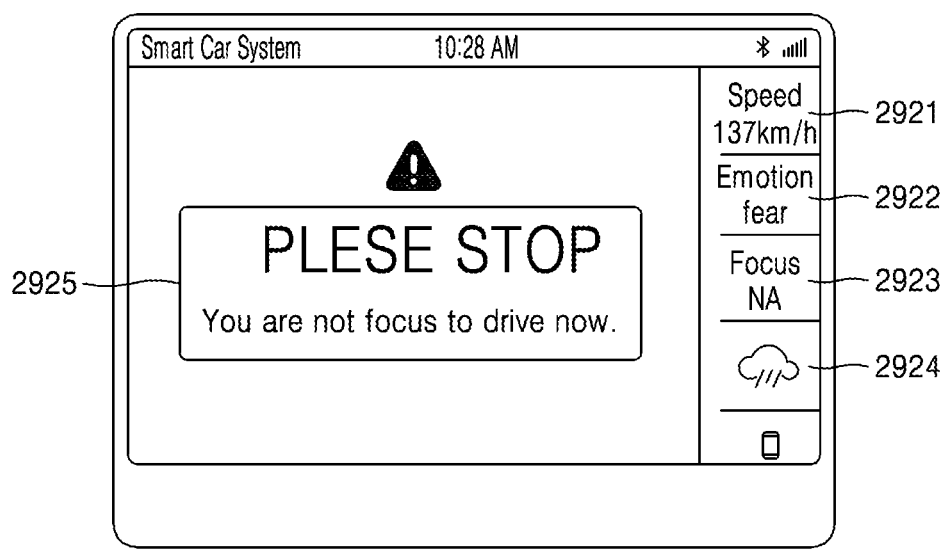

PERSONAL SAFETY DEVICE AND OPERATING METHOD THEREFOR

TECHNICAL FIELD

Various embodiments relate to a personal safety device and an operating method of the same, and more particularly, to a device and method for securing a user's safety, based on the user's various types of environment information.

BACKGROUND ART

With the advancement of technology, personalized experiences and solutions can be brought by technology to a next level to adjust the solutions to fit the context of a situation and personal habits and to respond to people's moods and emotions. Latest mobile electronic devices, such as smart phones and smart watches, can provide a simple and intelligent personal safety system to enhance the safety of humans and the sense of safety in dynamic environments.

DESCRIPTION OF EMBODIMENTS

Technical Problem

Various embodiments are directed to a personal safety device capable of collecting a user's environment information through simple components thereof, and determining and performing an action suitable for the user's situation, based on the user's environment information, thereby more effectively securing the user's safety, and an operating method of the same.

Solution to Problem

According to embodiments, a personal safety device of determining an action to be performed for a user, based on at least one of a user's personal environment information or surrounding environment information, and performing the action, and an operating method of the same are provided.

Advantageous Effects of Disclosure

According to various embodiments, a personal safety system capable of more effectively securing a user's safety by simple components thereof can be provided.

BRIEF DESCRIPTION OF DRAWINGS

FIG. 29 is a sample scenario of an alarm of a smart car system according to an embodiment.

BEST MODE

Figure 1:
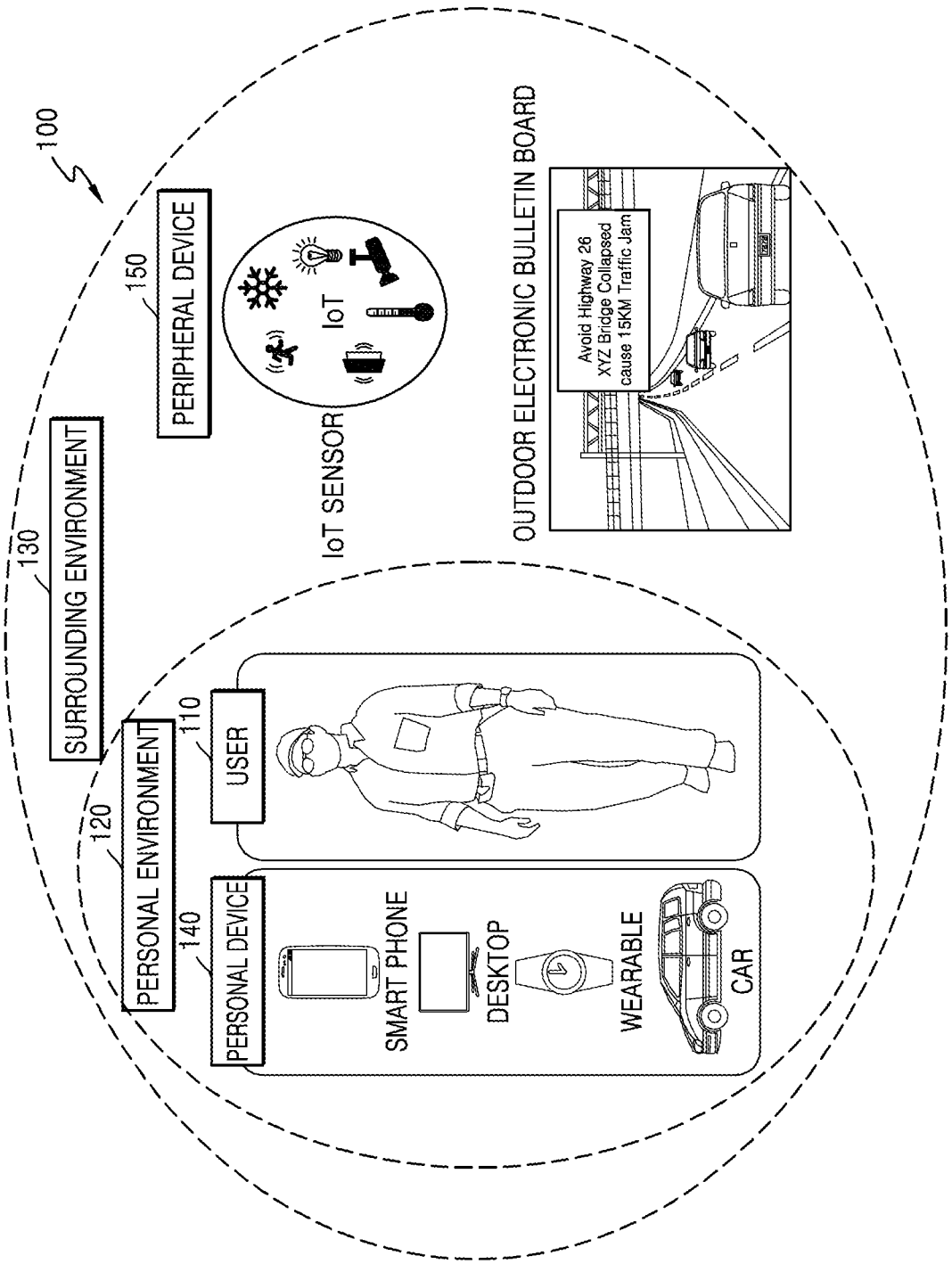
FIG. 1 is a reference diagram for describing the concept of a personal safety system according to an embodiment.

According to an embodiment, a personal safety device includes a communication interface; a memory storing at least one instruction; and a processor configured to execute the at least one instruction to obtain at least one of a user's personal environment information or surrounding environment information, identify an action to be performed for the user, based on the obtained at least one of the personal environment information or the surrounding environment information, identify a device to perform the determined action, based on the obtained at least one personal environment information or surrounding environment information, and perform the identified action by using the identified device.

In one embodiment, the user's personal environment information may include the user's physical/biological environment information and the user's psychological environment information.

In one embodiment, the processor may be further configured to execute the at least one instruction to obtain the user's physical environment information from the user's location information or speed information, and identify the user's movement type, based on the user's physical environment information.

In one embodiment, the processor may be further configured to execute the at least one instruction to obtain the user's biological environment information from the user's biological data sensed by one or more sensors, and identify the user's physical condition, based on the user's biological environment information.

In one embodiment, the processor may be further configured to execute the at least one instruction to obtain the user's psychological environment information from information regarding the user's behavior in a social service application or a messaging application via the Internet, and identify the user's emotion type, based on the psychological environment information.

In one embodiment, the processor may be configured to execute at least one instruction to identify the action to be performed for the user, based on at least one of the identified user's movement type, physical condition, or emotion type.

In one embodiment, the action may include at least one of outputting an image, outputting a warning, outputting an audio signal, or controlling Internet-of-things.

In one embodiment, the device to perform the action may include the user's personal device or a peripheral device around the user, which is capable of being controlled by the user.

In one embodiment, the environment information, the action, and the device to perform the action may be capable of being customized by the user.

In one embodiment, the personal safety device may be embodied as a system-on-chip.

According to an embodiment, an operating method of a personal safety device includes obtaining at least one of a user's personal environment information or surrounding environment information; identifying an action to be performed for the user, based on the obtained at least one of the personal environment information or the surrounding environment information; identifying a device to perform the determined action, based on the obtained at least one of the personal environment information or the surrounding environment information; and performing the identified action by using the identified device.

According to an embodiment, there is provided a non-transitory computer-readable recording medium storing a program for executing an operating method of a personal safety device in a computer.

MODE OF DISCLOSURE

The terms used herein will be briefly described and then the disclosure will be described in detail.

In the disclosure, general terms that have been widely used nowadays are selected, when possible, in consideration of functions of the disclosure, but non-general terms may be selected according to the intentions of technicians in the this art, precedents, or new technologies, etc. Some terms may be arbitrarily chosen by the present applicant. In this case, the meanings of these terms will be explained in corresponding parts of the disclosure in detail. Accordingly, the terms used herein should be defined not based on the names thereof but based on the meanings thereof and the whole context of the disclosure.

It will be understood that when an element is referred to as "including" another element, the element may further include other elements unless mentioned otherwise. The terms "unit", "module", etc. used herein should be understood to mean a unit for processing at least one function or operation and may be embodied as hardware, software, or a combination of hardware and software.

Embodiments will be described in detail with reference to the accompanying drawings below so that those of ordinary skill in the art may easily implement them. However, the disclosure may be embodied in many different forms and is not limited to embodiments set forth herein. In the drawings, for clarity, parts that are not related to describing the disclosure are omitted. Throughout the specification, like reference numerals are assigned to like elements.

In embodiments as set forth herein, the term "user" refers to a person who controls a function or an operation of an image display device through a control device, and may include a viewer, a manager, or an installation engineer.

The present disclosure suggests a system-on-chip (SoC) type intelligent personal safety system to which ensemble learning which is a combination of an online learning model and a batch learning model optimized for a SoC environment is applied and in which multi-recognition technologies are integrated. The present disclosure is implemented on a SoC module to perform various sensing and actuating processes, including machine learning computing, and employs a number of sophisticated multi-recognition techniques to respond to a user's mood and emotion. Self-recommendation may be provided according to the context of a dynamic environment. A user may design and manage his or her own personal safety system by using a personal portable device, based on user context obtained from various sensors and sources. A user's safety may be prioritized, and potential risks or threats may be avoided in any environment while maintaining the user's privacy, when the user performs all calculations on a SoC. The technology disclosed in the present disclosure is applicable to various types of smart devices to prioritize a user's safety in a dynamic environment.

FIG. 1 is a reference diagram for describing the concept of a personal safety system according to an embodiment.

Referring to FIG. 1, a personal safety system according to an embodiment collects information regarding a personal environment 120 or a surrounding environment 130 of a user 110, and analyzes the safety of the user 110 by using on the collected information regarding the personal environment 120 or the surrounding environment 130. The personal safety system according to an embodiment may provide a notification to the user 110 by using one or more devices when it is determined that the user 110 is not safe as a result of analyzing the safety of the user 110.

Environments of the user 110 may include the personal environment 120 and the surrounding environment 130. The personal environment 120 may include a physical/biological environment and a psychological environment of the user 110. The physical/biological environment of the user 110 refers to biological data of the user 110 which may be measured by various sensors. The physical/biological environment may include, for example, a location, a speed, a pulse, blood pressure, a heart rate, etc. of the user 110. The location or speed of the user 110 may be obtained, for example, by a global positioning sensor (GPS) sensor or a gyroscope installed in a smart device. The pulse, blood pressure, heart rate, or the like of the user 110 may be measured, for example, by various sensors installed in a wearable device. The physical/biological environment of the user 110 may be considered to determine a physical condition of the user 110.

The psychological environment of the user 110 refers to a behavior of the user 110 on the Internet. For example, the psychological environment may include a user's behavior in the user's social network application or messaging application, i.e., text or an emoticon input by the user, the user's voice, or an image that the user uses. The psychological environment of the user 110 may be considered to identify an emotional state of the user 110.

The surrounding environment 130 of the user 110 refers to a state in the vicinity of the user 110 rather than a personal environment of the user 110. For example, the surrounding environment 130 may include accidents, natural disasters, etc. occurring in the vicinity of the user 110.

According to an embodiment, the personal safety system may identify a safety state of the user 110 by combining the personal environment 120 and/or the surrounding environment 130 of the user 110.

According to an embodiment, the personal safety system may determine that it is necessary to provide a notification to the user 110 as a result of identifying the safety state of the user 110.

Furthermore, according to an embodiment, the personal safety system may determine a user device to be used to provide the notification to the user 110, based on the information regarding the personal environment 120 or the surrounding environment 130 of the user 110. The user device may include a personal device 140 or a peripheral device 150.

The personal device 140 is a device controllable by the user 110, and may include a smart phone, a desktop computer, a wearable device, a smart car, or the like of the user 110. The peripheral device 150 is a device around the user 110, and may include, for example, various Internet-of-thing (IoT) sensors, an outdoor electronic bulletin board, etc.

Figure 2:
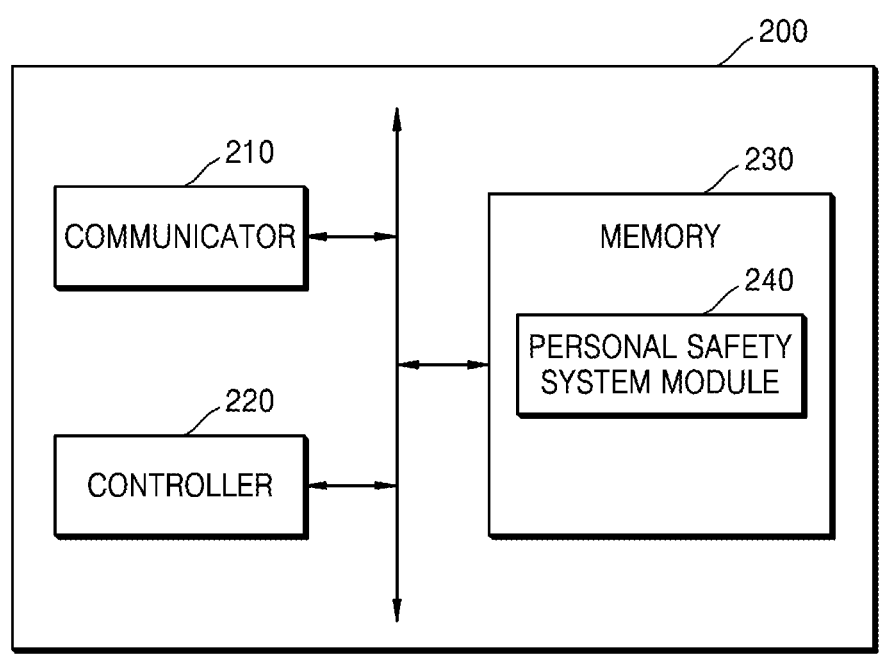
FIG. 2 is a block diagram of a personal safety device according to an embodiment.

FIG. 2 is a block diagram of a personal safety device according to an embodiment.

Referring to FIG. 2, a personal safety device 200 includes a communicator 210, a controller 220, and a memory 230.

The communicator 210 may connect the personal safety device 200 to an external terminal device under control of the controller 220. The communicator 210 may include a wireless local area network (LAN) or a wired Ethernet. Alternatively, the communicator 210 may include a combination of the wireless LAN and the wired Ethernet.

In one embodiment, the communicator 210 may receive information regarding a user's psychological environment, i.e., information regarding the user's behavior on the Internet, from a server computer. The user's behavior on the Internet may include, for example, the user's behavior in the user's social network application or messaging application, i.e., text or an emoticon input by the user, the user's voice, an image that the user uses, or the like.

The memory 230 may store various data, programs, or applications for driving and controlling the personal safety device 200 under control of the controller 220.

The memory 230 may store an operation system (OS) for control of the personal safety device 200 and the controller 220, applications initially provided by a manufacturer or downloaded from an external source, a graphical user interface (GUI) related to the application, an object providing the GUI (e.g., image text, an icon, a button, etc.), document, a database, or related data.

The memory 230 include read-only memory (ROM), random access memory (RAM), or a memory card (not shown) (e.g., a micro-secure digital (SD) card or a USB memory) installed in the personal safety device. Alternatively, the memory 230 may include a nonvolatile memory, a volatile memory, a hard disc drive (HDD) or a solid state drive (SSD).

In particular, in one embodiment, the memory 230 may include a personal safety system module 240.

The controller 220 controls overall operations of the personal safety device 200 and the flow of a signal between internal components of the personal safety device 200, and performs a data processing function. When a user input is given or a predetermined and stored condition is satisfied, the controller 220 may execute the OS and various applications stored in the memory 230, and at least one application stored in the personal safety system module 240.

The controller 220 may include a RAM to store a signal or data input from the outside of the personal safety device 200 or to be used as a storage region corresponding to various operations performed by the personal safety device 200, a ROM storing a control program for control of the personal safety device 200, and a processor.

In the controller 220, the processor may be embodied as a SoC that is a combination of a core (not shown) and a GPU (not shown). Alternatively, the processor may include a plurality of processors. For example, the processor may be embodied as a main processor (not shown) and a sub processor operating in a sleep mode (not shown).

In one embodiment, the controller 220 may execute at least one instruction stored in the personal safety system module 240 included in the memory 230 to obtain at least one of a user's personal environment information or surrounding environment information, determine an action to be performed for the user, based on the at least one of the personal environment information or the surrounding environment information, determine a device to perform the determined action, based on the at least one of the personal environment information or the surrounding environment information, and perform the determined action by the determined device.

In one embodiment, the user's personal environment information may include the user's physical/biological environment information and the user's psychological environment information.

In one embodiment, the controller 220 may execute at least one instruction stored in the personal safety system module 240 included in the memory 230 to obtain the user's physical environment information from the user's location information or speed information and determine the user's movement type, based on the user's physical environment information.

In one embodiment, the controller 220 may execute at least one instruction stored in the personal safety system module 240 included in the memory 230 to obtain the user's biological environment information from the user's biological data sensed by one or more sensors and determine the user's physical condition, based on the user's biological environment information.

In one embodiment, the controller 220 may execute at least one instruction stored in the personal safety system module 240 included in the memory 230 to obtain the user's psychological environment information from information regarding the user's behavior in a social service application or a messaging application via the Internet and determine the user's emotion type, based on the user's psychological environment information.

In one embodiment, the controller 220 may execute at least one instruction stored in the personal safety system module 240 included in the memory 230 to determine an action to be performed for the user, based on at least one of the user's movement type, the user's physical condition, or the user's emotion type.

In one embodiment, the action may include at least one of outputting an image, outputting a warning, outputting an audio signal, or controlling an IoT device.

In one embodiment, the device to perform the action may include the user's personal device controllable by the user or a peripheral device around the user.

In one embodiment, the environment information, the action, and the device to perform the action are capable of being customized by the user.

The illustrated block diagram of the personal safety device 200 is merely an example. Some of the components illustrated in the block diagram may be combined or omitted or other components may be added according to the specifications of the personal safety device 200 implemented actually. That is, two or more components may be combined to one component or one component may be divided into two or more components, if necessary. In addition, a function performed by each block is an example provided to describe embodiments, and the present disclosure is not limited by an operation or a device corresponding to each block.

The personal safety device 200 illustrated in FIG. 2 may be embodied as an independent terminal device. When the personal safety device 200 is embodied as an independent terminal device, the personal safety device 200 may further include various types of sensors, a user inputter/outputter, and a video/audio outputter.

Alternatively, the personal safety device 200 of FIG. 2 may be embodied in the form of a SoC in another type of a user terminal device, e.g., a smart phone, a wearable device, a personal portable device, or the like.

Alternatively, the personal safety device 200 of FIG. 2 may be included in a server computer.

Figure 3:
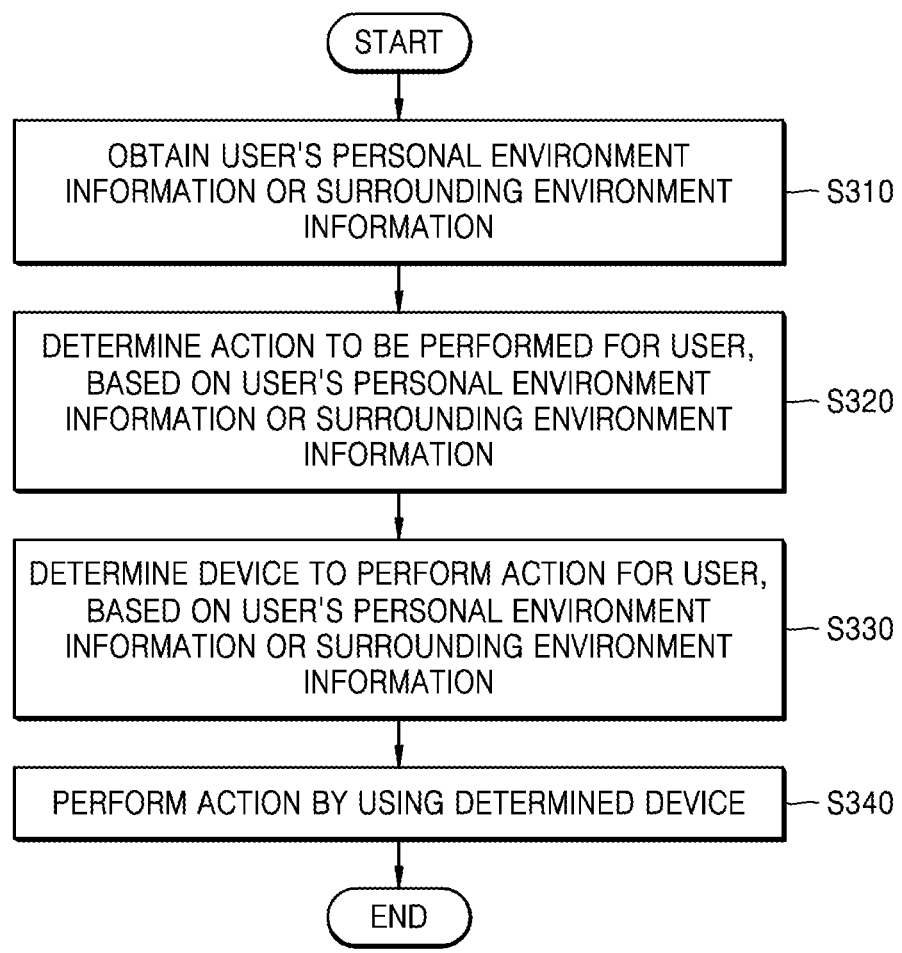
FIG. 3 is a flowchart of an operating process of a personal safety device, according to an embodiment.

FIG. 3 is a flowchart of an operating process of a personal safety device according to an embodiment.

Referring to FIG. 3, in operation S310, a personal safety device may obtain a user's personal environment information or surrounding environment information. The user's personal environment may include the user's physical/biological environment and psychological environment. The user's physical/biological environment information may be obtained by various sensors included in the user's wearable device, a position sensor included in the user's smart phone, or the like. The user's psychological environment information may be obtained, based on the user's behavior on the Internet. The user's surrounding environment information may be obtained by various IoT sensors around the user or by a server.

In operation S320, the personal safety device may determine an action to be performed for the user, based on the user's personal environment information or surrounding environment information. The personal safety device may determine an action appropriate for the user, based on whether the user is moving at high speeds, i.e., whether the user is driving a car, and the user's emotional state. The action to be performed for the user may include, for example, notifying a warning, outputting an audio signal, outputting a message, or controlling an IoT device around the user.

For example, when the user shows a gloomy emotion while driving, the personal safety device may determine, as the action, to output happy music using a smart car.

For example, when the user shows anger while driving, the personal safety device may determine, as the action, to output warning sound or a warning message through a smart car or a wearable device.

For example, when the user shows a sad emotion at home, the personal safety device may determine, as the action, to control an IoT device to control an indoor lighting to be brighter and control a speaker to output pleasant music.

In operation S330, the personal safety device may determine a device to perform the action for the user, based on the user's personal environment information or surrounding environment information. The personal safety device may determine a device to perform the action for the user, based on whether the user is moving at high speeds or the like. The device to perform the action may include a personal device and a peripheral device. The personal device may include the user's terminal device controllable by the user, e.g., a smart phone, a wearable device, or a smart car, and the peripheral device is a device which is not controllable by the user and may include an IoT device around the user, an outdoor electronic bulletin board, or the like. For example, while the user is driving, the personal safety device may determine to provide a notification via the user's wearable device or smart car rather than the user's smart phone.

In operation S340, the personal safety device may perform the action by using the determined device.

Figure 4:
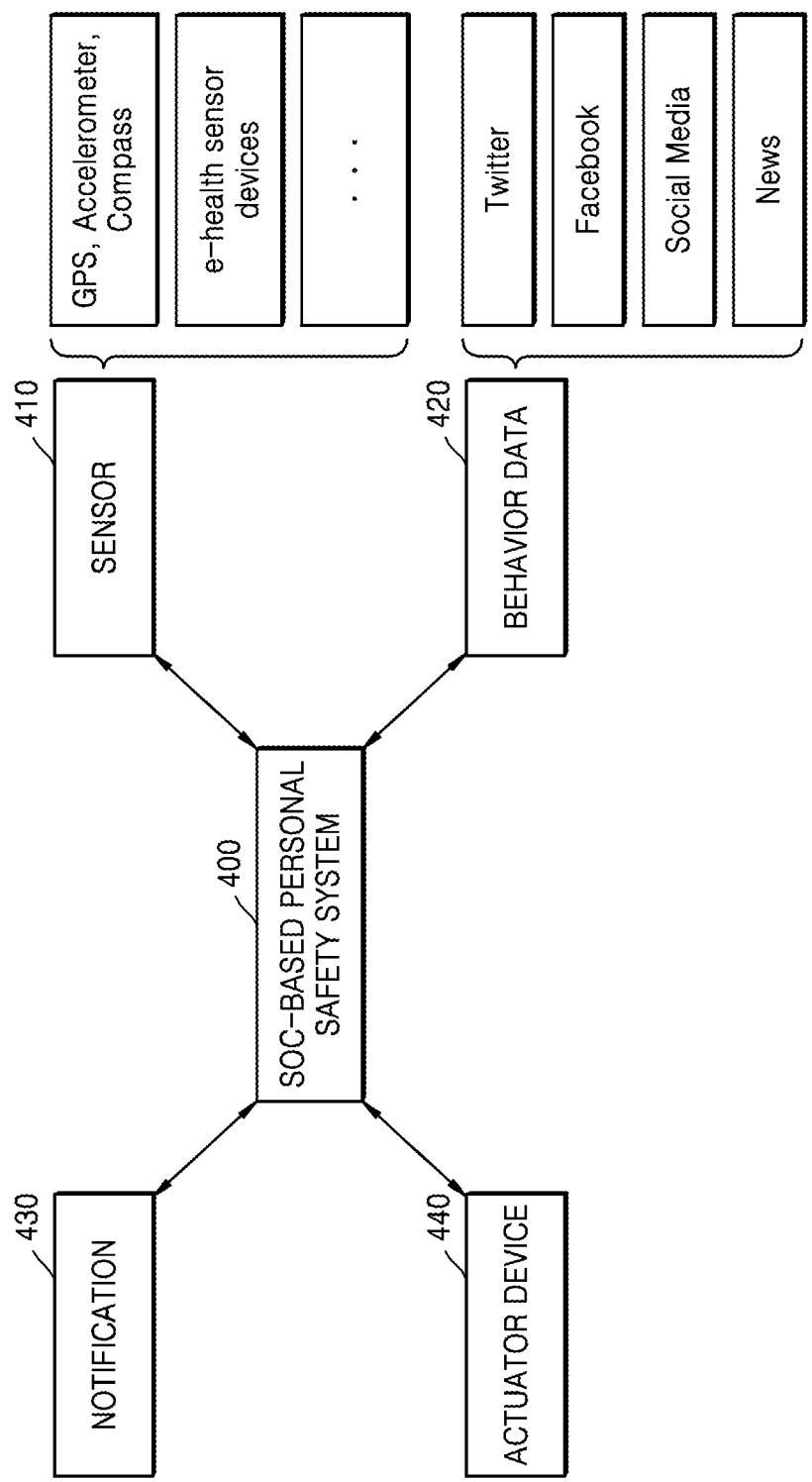
FIG. 4 illustrates a general overview of a SoC module-based personal safety system according to an embodiment.

FIG. 4 illustrates a general overview of a SoC module-based personal safety system according to an embodiment.

Referring to FIG. 4, a SoC-based personal safety system 400 may include various types of modules of different functions, such as a microprocessor unit (MCU), a storage, a network module, and a general-purpose input/output (GPIO). The personal safety system 400 may be combined with a sensor device 410, such as a GPS, an accelerometer, a compass, or a health sensor device, to sense a user's physical environment. Furthermore, the personal safety system 400 may receive the user's behavior data 420 through a communication interface or the like. The user's behavior data 420 may include the user's behavior on the Internet, e.g., the user's behavior, history or the like in a social network service, such as Twitter, Facebook, social media, or news. The user's behavior on the Internet may be considered to determine the user's psychological environment, i.e., the user's emotion.

The personal safety system 400 may identify the user's safety state, based on sensing data from the sensor device 410 or the user's behavior data 420, and provide the user with a notification 430 or display the notification 430 via an actuator device 440, based on a result of identifying the user's safety state.

Alternatively, the personal safety system 400 may determine a medium and a method to be used to notify the user of the result of identifying the user's safety state, based on the sensing data or the user's behavior data. That is, the personal safety system 400 may determine a device most appropriate to notify the user of the result of identifying the user's safety state, based on the user's safety state.

Alternatively, the personal safety system 400 may use mechanical learning computing to identify the user's safety state or notify the result of identifying the user's safety state.

Figure 5:
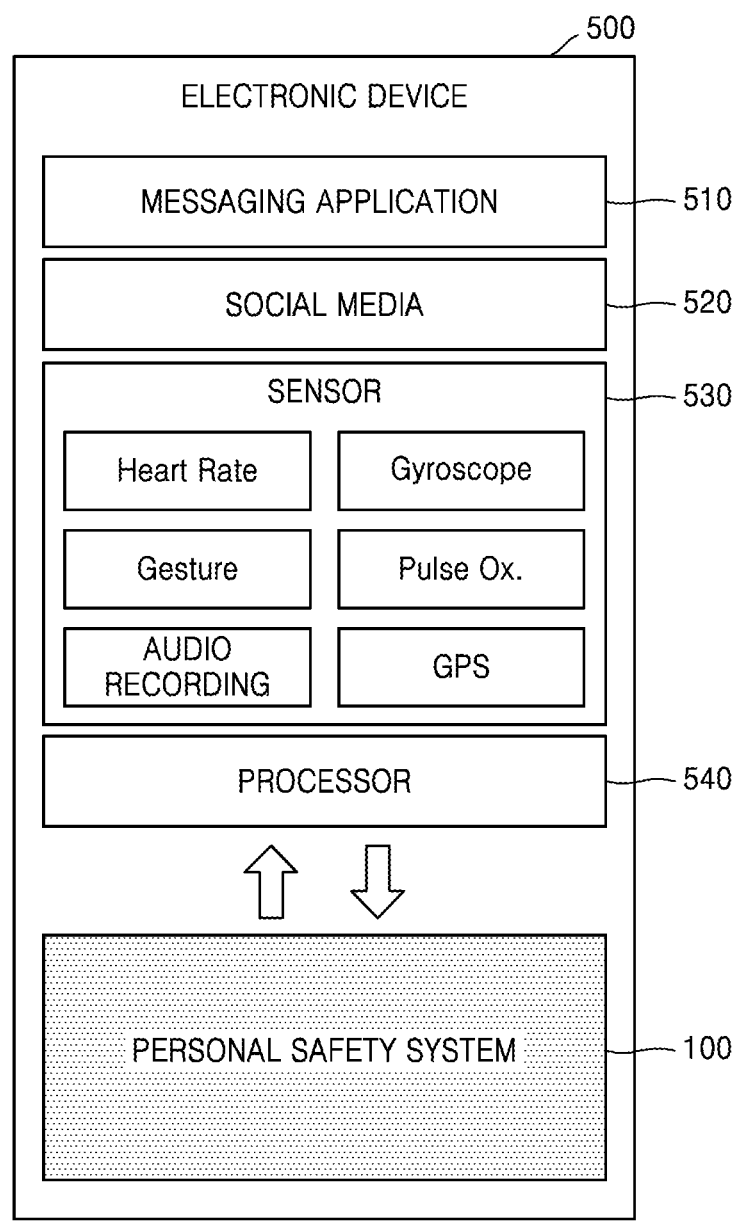
FIG. 5 illustrates an example of an electronic device in which a personal safety system is installed, according to an embodiment.

FIG. 5 illustrates an example of an electronic device in which a personal safety system is installed, according to an embodiment.

Referring to FIG. 5, an electronic device 500 in which a personal safety system 100 is installed may include a personal electronic device, such as a smart phone or a smart watch.

The electronic device 500 includes a messaging application 510, a social media application 520, a sensor 530, and a processor 540, and may further include a personal safety system 100.

The sensor 530 may measure a user's various biological data, and include, for example, a heart rate sensor, a gyroscope, a gesture sensor, a pulse sensor, etc.

The processor 540 controls internal components of the electronic device 500.

Figure 6:
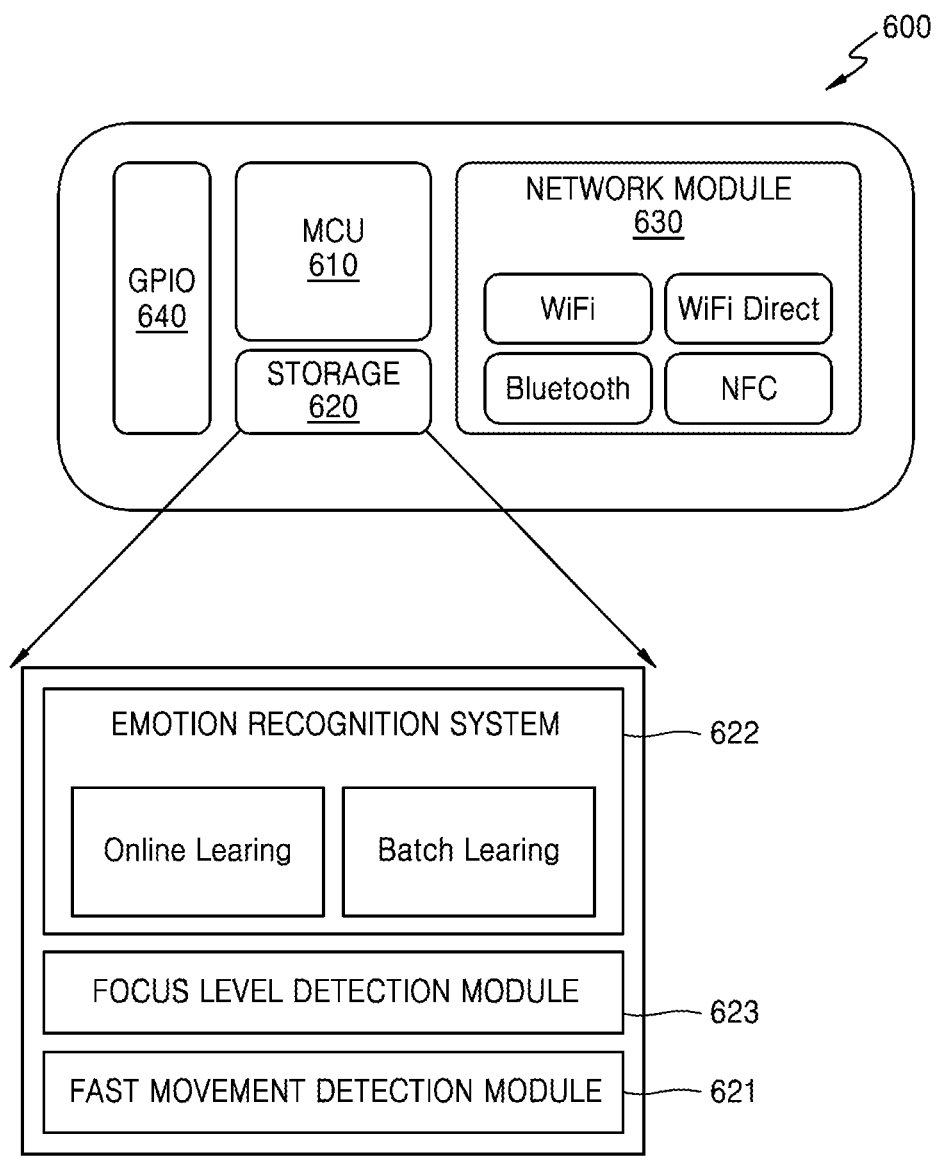
FIG. 6 illustrates a SoC module architecture of a personal safety system 600.

FIG. 6 illustrates a SoC module architecture of a personal safety system 600.

The personal safety system 600 based on a SoC may include various types of modules of different functions, such as an MCU 610, a storage 620, a network module 630, and a GPIO 640.

Referring to FIG. 6, a SoC form is used as a major feature of a central intelligent personal system. The MCU 610 may perform various machine learning calculations. The storage 620 may store a program and data. The network module 630 may process communication between the MCU 610 and an external system, and include, for example, a WiFi module, a WiFi direct module, a Bluetooth module, and a near-field communication (NFC) module. The GPIO 640 may be a SoC input/output (I/O) pin, include various modules to operate an intelligent system, and be used to connect to an external sensor, an external actuator, and other systems.

The SoC-based personal safety system 600 may be operated as a stand-alone system with an MCU capable of managing all I/O processes. This means that a user is able to build his or her own printed circuit board (PCB) using an integrated SoC-based personal safety device for a special purpose. In an embodiment, the SoC-based personal safety system 600 may be installed in a smart phone, a wearable device, or other device boards capable of controlling the personal safety system.

The SoC-based personal safety system 600 may be embodied as a complicated entity in which some hardware components such as an MCU, a storage, a network module, and a GPIO are integrated. All smart/intelligent operations may be performed together with an input obtained by a specific embedded device capable of being used as a smart phone or a smart watch. A first intelligent operation of the SoC-based personal safety system 600 is dynamic movement detection. A fast movement detection module 621 is an intelligent system allowing to detect a category of a movement when a user is moving at high speeds. When a smart watch senses such a type of movement, a notification regarding a fast motion category may be transmitted to a device, such as a smart phone/smart watch, which is connected to the user, and thereafter, the SoC-based personal safety system 600 may automatically activate an emotion recognition system (ERS) 622.

The ERS 622 may predict the user's emotional state at a specific moment by consuming the user's social media activity sensed by a sensor and input biological data. Bidirectional communication may be performed according to the SoC-based personal safety system 600 and an embedded device. A smart watch/smart phone, which is an embedded device, automatically activates the user's heart rate sensor and a hand gesture sensor. The smart phone may record the user's biometric data, transmit the user's biometric data to the ERS 622, collect data of the user's previous activities from the user's social media, and collect additional information from a messaging application to predict the user's emotional state.

An ensemble learning approach using a combination of two types of learning models: 1) online learning model for calculating sensor and audio data and 2) a batch learning model for processing text data is applicable to the present disclosure. When a result indicates a negative emotional state, the ERS 622 directly notifies an action processing module 624 of the result. Alternatively, a focus level detection module 623 may deeply inspect the user's state even in a positive emotional state. Finally, the ERS 622 may transmit the result to the action processing module 624.

The action processing module 624 may calculate a prediction model, based on the user's emotional state, determine an action appropriate for the user, based on the user's various environment information such as the user's emotional state and the user's movement state, determine a device to perform the action, and take an appropriate action according to the determined action by using the determined device.

Figure 7:
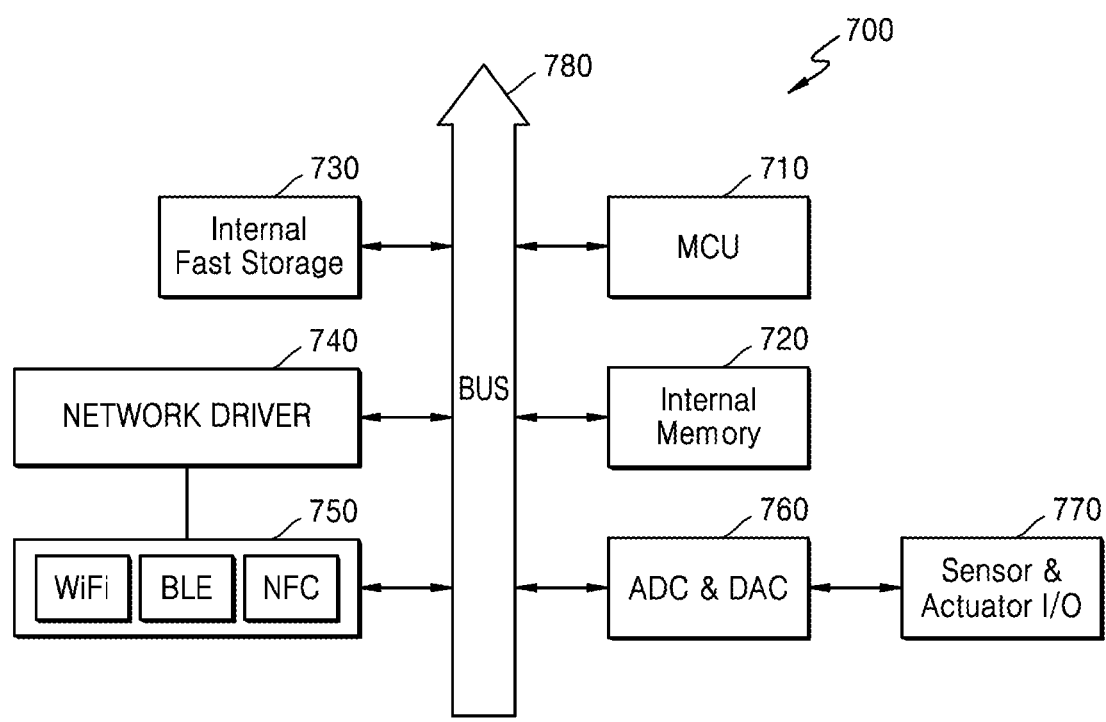
FIG. 7 illustrates a logical design of a personal safety system for bus communication, according to an embodiment.

FIG. 7 illustrates a logical design of a personal safety system for bus communication, according to an embodiment.

Referring to FIG. 7, a personal safety system accord to an embodiment may be in in the form of a finished chip which includes a basic entity operating in a BUS system and a SoC executing machine learning with optimal computation. The personal safety system may include several modules communicating with one another via a bus 780.

An MCU 710 is a core of computational units that perform and control machine learning computation.

An internal memory 720 is a high-speed memory that stores temporary parameters of a machine learning algorithm.

An internal high-speed storage 730 is a permanent storage used to store data related to a machine learning application program and may be used to store a key safety system.

A network driver 740 is a network interface module for communicating with a previously installed network module 750, such as WiFi, BLE, or NFC.

An analog-digital converter (ADC) and digital-analog converter (DAC) 760 is an analog-digital processing converter used to communicate with a sensor and an actuator I/O 770 according to the I2C/SPI protocol.

Figure 8:
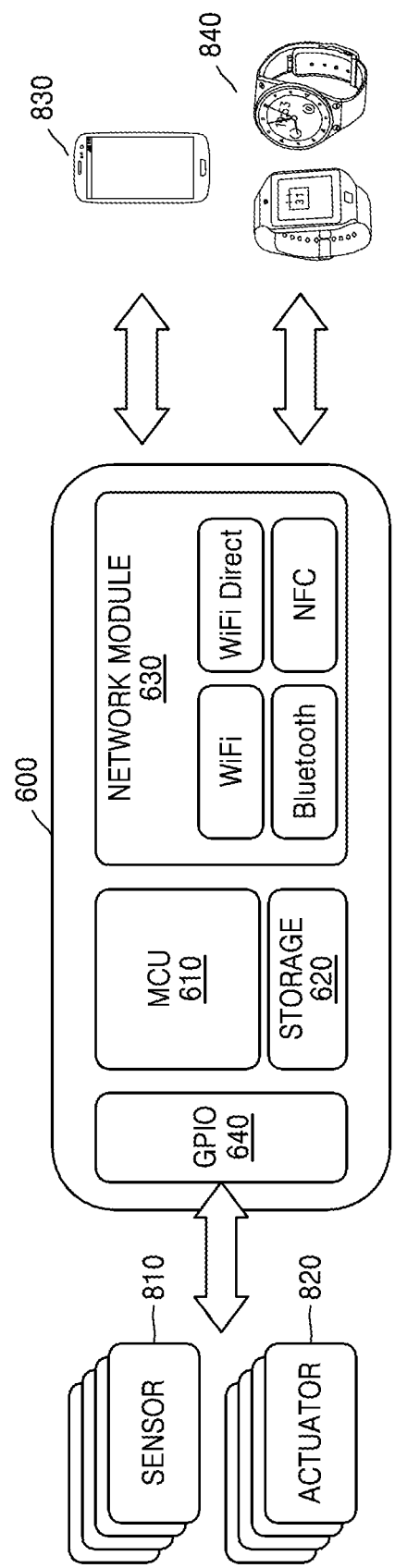
FIG. 8 illustrates a general overview of connection of a SoC based on a personal safety system to a sensor and an actuator device, according to an embodiment.

FIG. 8 illustrates a general overview of connection of a SoC based on a personal safety system to a sensor and an actuator device, according to an embodiment.

Referring to FIG. 8, a smart phone 830 or a wearable device 840 may perform a machine learning calculation by using a SoC-based personal safety system installed therein. Data may be obtained through social media from an external source, such as social media or a public safety web, via a connected sensor device and the Internet.

A SoC-based personal safety system 600 may be extended by adding external sensors 810 and actuator devices 820. Data obtained by each of the sensors 810 may be controlled by the SoC-based personal safety system 600. Thereafter, whether a dangerous situation occurs in a user's environment may be checked through calculation of the data.

Because the SoC-based personal safety system 600 is designed in a SoC form, the SoC-based personal safety system 600 according to the present disclosure may operate as a stand-alone system for performing all activities related to personal safety. Alternatively, the SoC-based personal safety system 600 may be embedded in a devices such as a smart phone, a wearable device, and a general built-in board device.

Even when the SoC-based personal safety system 600 is arranged on a wearable device or a smart phone, which is an IoT board, the wearable device or the smart phone may include a main control device. Thus, the wearable device or the smart phone may transmit a command to the SoC-based personal safety system 600 to perform a mechanical learning calculation.

Alternatively, the SoC-based personal safety system 600 distributed on a customized board may serve as the main control device. In this case, the SoC-based personal safety system 600 is capable of managing all resources for sensors and actuators to manage the mechanical learning calculation.

Figure 9:
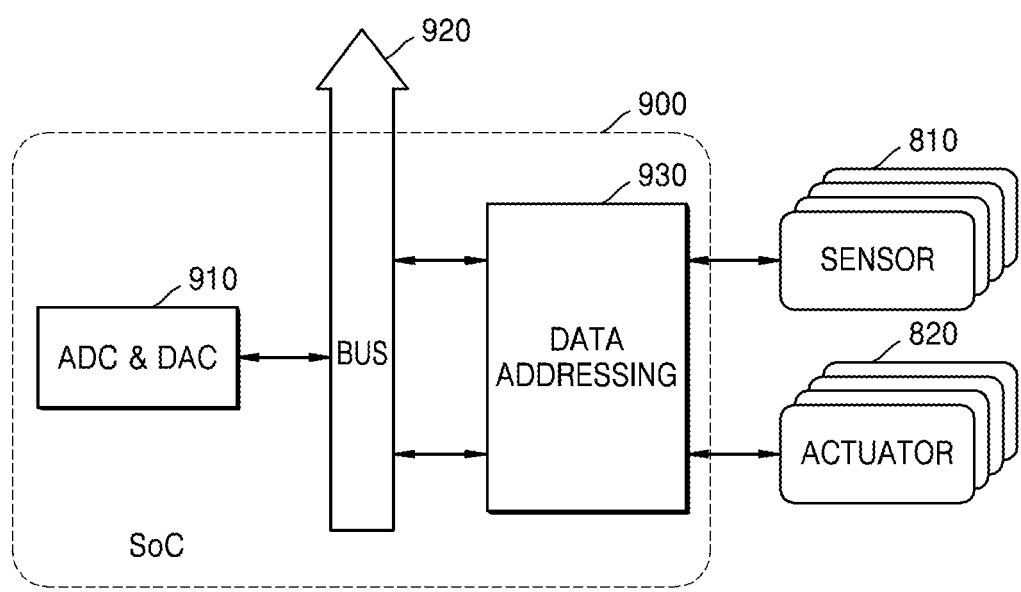
FIG. 9 illustrates a communication model for an external sensor/actuator according to an embodiment.

FIG. 9 illustrates a communication model for an external sensor/actuator according to an embodiment.

FIG. 9 illustrates control of each sensor 810 and each actuator device 820 connected to a SoC 900 through data addressing. A data address designator 930 may be configured to map all external devices and embodied using inter-integrated circuit (I²C) and serial peripheral interface (SPI) protocol. This method is useful for many sensors and actuators. Each sensor 810 and each actuator device 820 has their own data addresses. An ADC/DAC module 910 may be used for digital-to-analog conversion or vice versa. The ADC/DAC module 910 and the data address designator 930 may communicate with each other via a bus 920.

Figure 10:
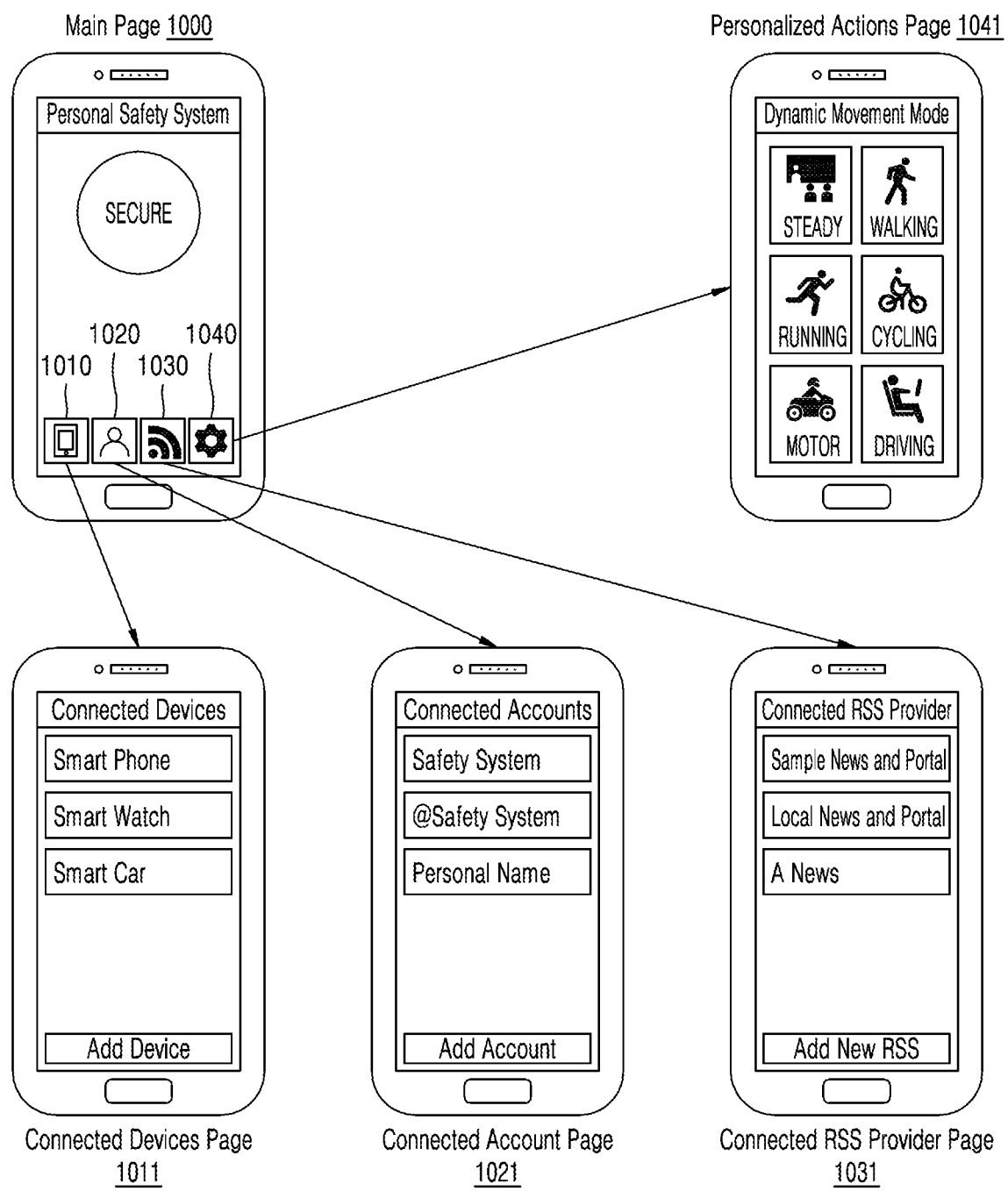
FIG. 10 is a detailed diagram illustrating features of a main menu of a personal safety system according to an embodiment.

FIG. 10 is a detailed diagram illustrating features of a main menu of a personal safety system according to an embodiment.

In one embodiment, customization features are provided for a user to configure a safety system according to the user's preference. Customization may include configuring a device to be connected to, configuring an account, configuring a service provider, and configuring an action, the customization being performed by a user.

Referring to FIG. 10, a main page 1000 provided by a personal safety system displayed on a smart phone may include a device configuration item 1010, an account configuration item 1020, a service provider configuration item 1030, and a personalized action configuration item 1040.

A page 1011 showing connected devices may be provided by selecting the device configuration item 1010.

A page 1021 showing connected accounts may be provided by selecting the account configuration item 1020.

A page 1031 showing connected service providers may be provided by selecting the service provider configuration item 1030.

A page 1041 showing personalized actions may be provided by selecting the personalized action configuration item 1040.

A protocol used to connect to devices may be used in other ways, such as Wi-Fi, Bluetooth, and USB. The use of the USB is intended to prevent consumption of a battery of the smart phone while the personal safety system is operated. This method may be used when the smart phone is connected to a smart car.

A sample scenario for registering a wearable device in a personal safety system and configuring an access protocol will be described with reference to FIGS. 11 and 12 below.

Figure 11:
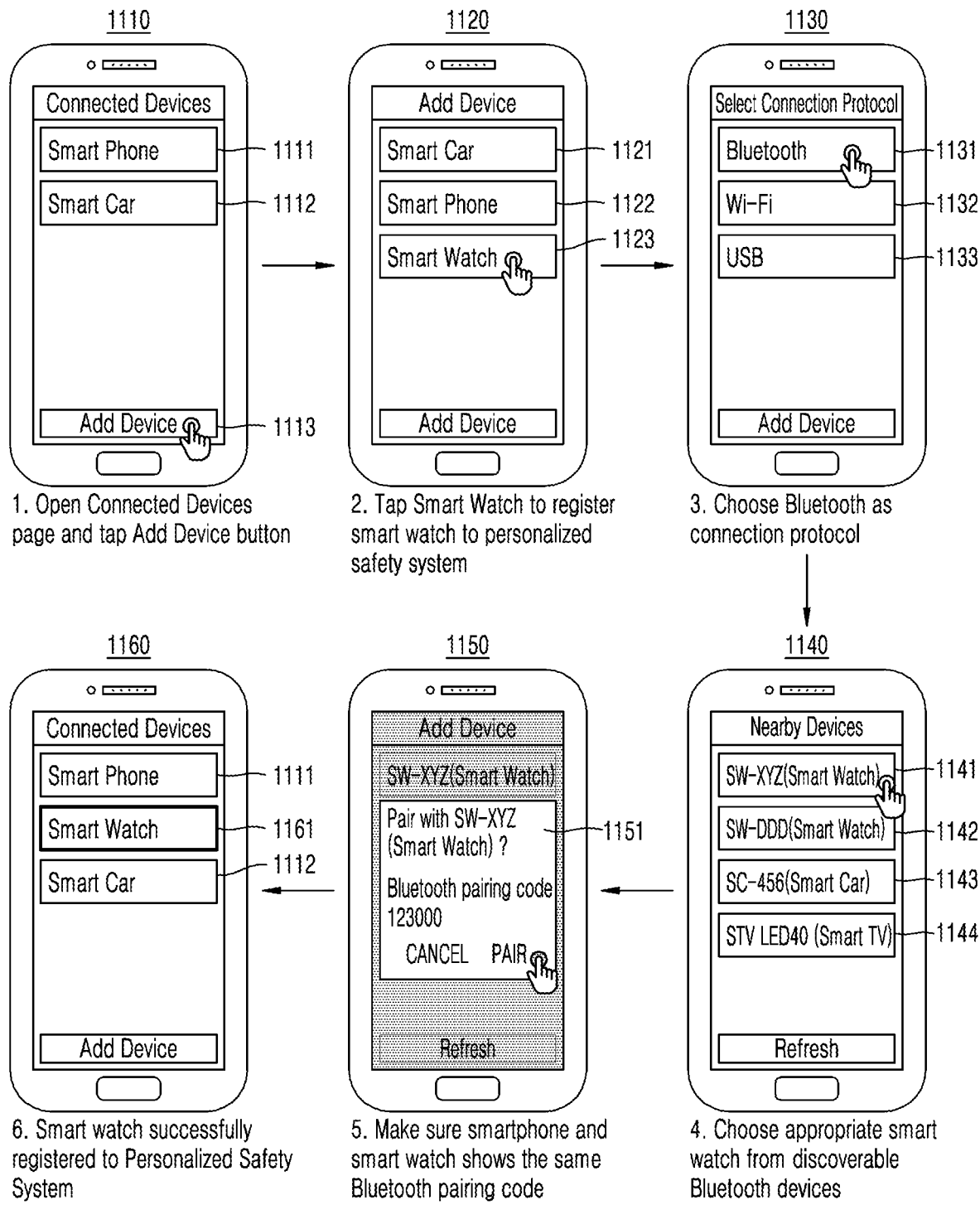
FIG. 11 illustrates a sample scenario for registration of a wearable device in a personal safety system according to an embodiment.

FIG. 11 illustrates a sample scenario for registration of a wearable device with a personal safety system according to an embodiment.

In one embodiment, a customization function provided by a personal safety system may include adding or removing a user's specific device. For example, devices to be added may be classified as a smart phone, a smart watch, and a smart car, and the user may add all supported devices to system precision and accuracy.

Referring to FIG. 11, a first page 1110 for configuring connected devices displays a smart phone 1111 and a smart car 1112 as connected devices. The first page 1110 further displays an 'add device' item 1113. When the 'add device' item 1113 is selected by a user, a second page 1120 is displayed.

The second page 1120 may display a smart car 1121, a smart phone 1122, and a smart watch 1123 as a list of devices to be added. When the smart watch 1123 is selected by the user, a third page 1130 is displayed.

The third page 1130 may display Bluetooth 1131, Wi-Fi 1132, and USB 1133 as a list of connection protocols. When the Bluetooth 1131 is selected by the user, a fourth page 1140 is displayed.

The fourth page 1140 may display an SW-XYZ (smart watch) 1141, an SW-DDD (smart watch) 1142, an SC-456 (smart car) 1143 and an STV LED 40 (smart TV) 1144. When the SW-XYZ (smart watch) 1141 is selected by the user, a fifth page 1150 is displayed.

The fifth page 1150 displays a message 1151 inquiring whether the SW-XYZ (smart watch) 1141 selected by the user is to be connected to by using a Bluetooth protocol. A sixth page 1160 is displayed when an answer to the inquiry is received.

The sixth page 1160 may display a newly added smart watch 1161 together with the smart phone 1111 and the smart car 1112 as connected devices.

Figure 12:
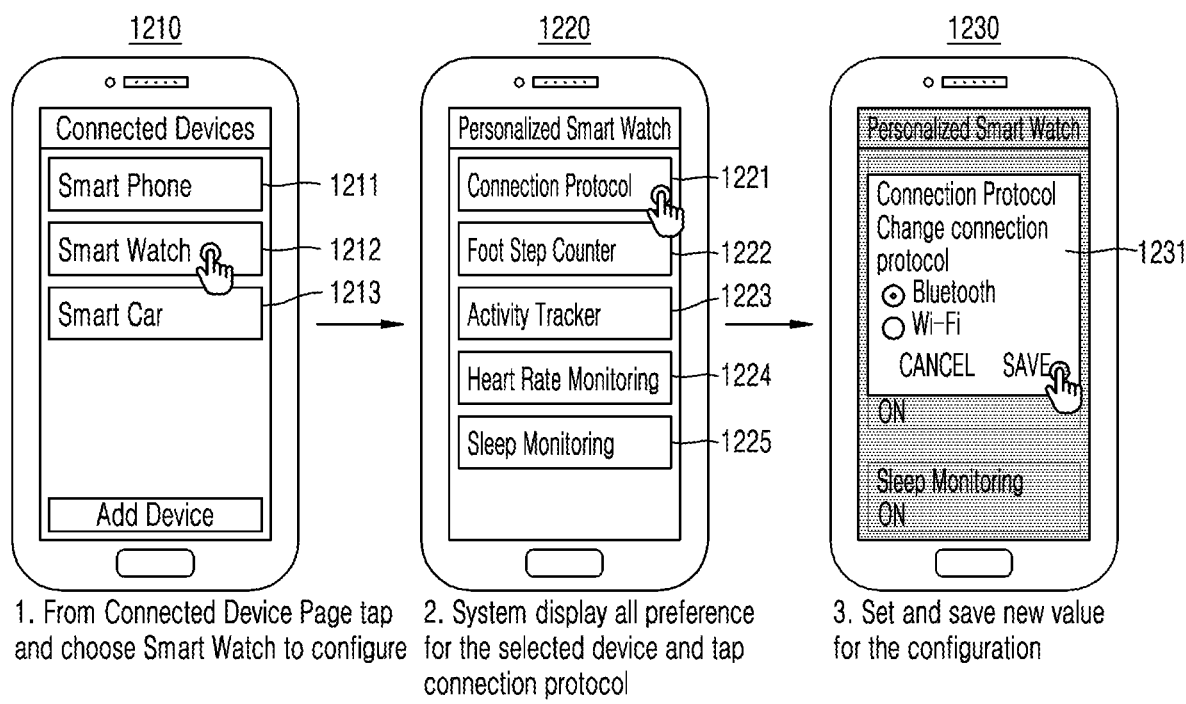
FIG. 12 illustrates a sample scenario for changing configuration of a connected device according to an embodiment.

FIG. 12 illustrates a sample scenario for changing configuration of a connected device according to an embodiment.

In one embodiment, a user may adjust a connection protocol between a smart phone and another device. The protocol used may include Wi-Fi, Bluetooth, USB, and other secure protocols supported between a major smart phone and other devices. For example, the user may connect to a smart watch by using Bluetooth as a protocol and may connect to a smart car by using a USB protocol. This option is displayed when the user opens access to a safety system, and a handshaking process may occur.

Referring to FIG. 12, a first page 1210 for configuring connected devices displays a smart phone 1211, a smart watch 1212, and a smart car 1213 as a list of connected devices. A second page 1220 is displayed according to an input for selecting the smart watch 1212.

The second page 1220 may display a connection protocol 1221, a foot step counter 1222, an activity tracker 1223, heart rate monitoring 1224, and sleep monitoring 1225, as a list of items for personalization of the smart watch 1212. A third page 1230 is displayed according to an input for selecting the connection protocol 1221.

The third page 1230 displays Bluetooth and Wi-Fi as a list 1231 of connectable protocols, and a connection protocol of the smart watch 1212 may be set to Bluetooth according to an input for selecting Bluetooth. To set up a protocol as described above, handshaking may be necessary for a smart phone to search for a related device to open connection to other devices and display a connection request to maintain security. The following system may be connected to and used as one of the sources for calculating safety factors.

Figure 13:
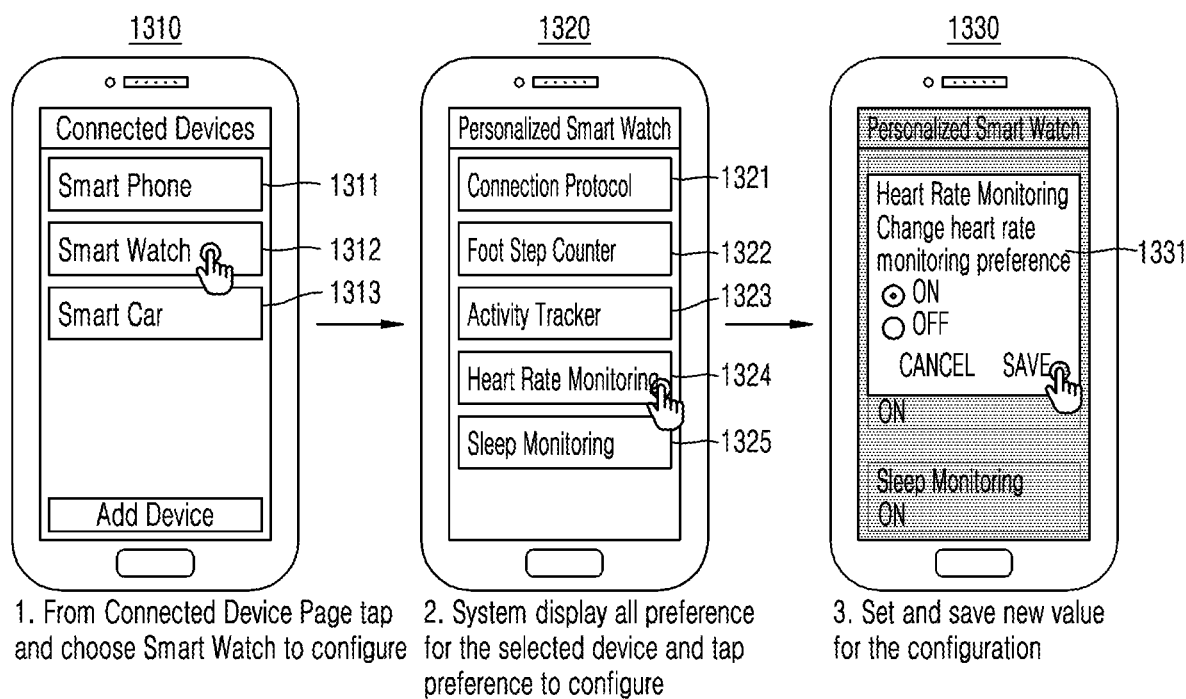
FIG. 13 illustrates a sample scenario for configuration of a heart rate monitoring in a wearable device by using a safety system according to an embodiment.

FIG. 13 illustrates a sample scenario for configuration of a heart rate monitoring in a wearable device by using a safety system according to an embodiment.

Figure 14:
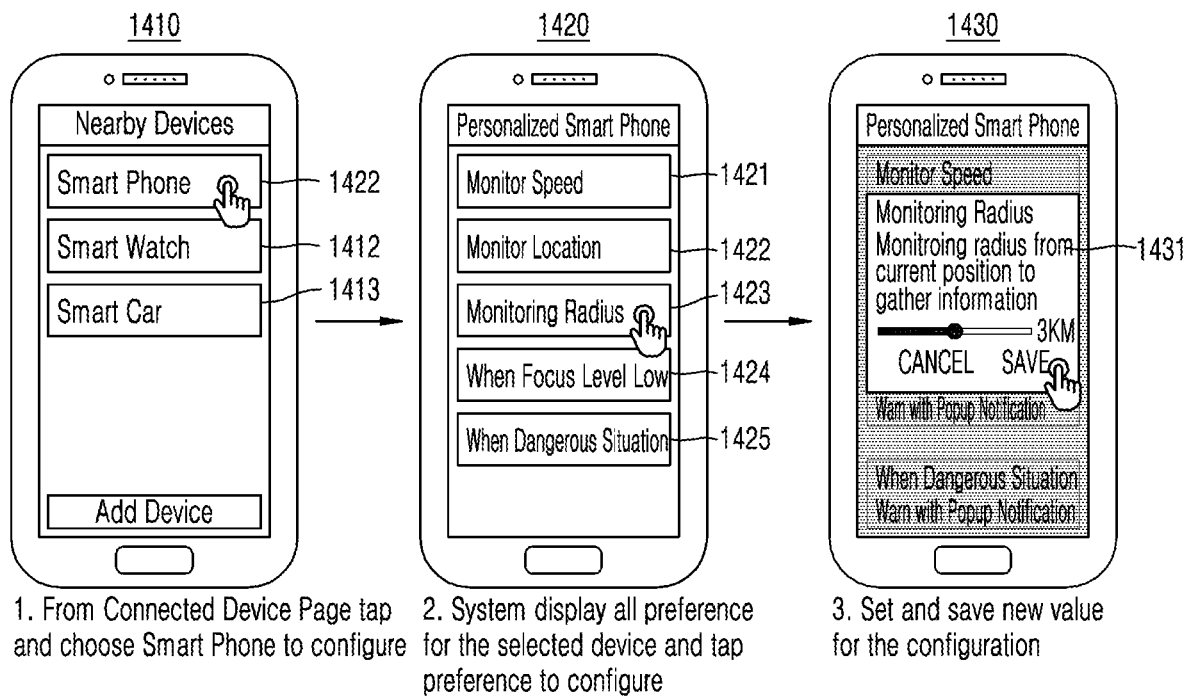
FIG. 14 illustrates a sample scenario for configuration of a monitoring radius in a smart phone according to an embodiment.

FIGS. 13 and 14 illustrate sample scenarios for configuring heart rate monitoring and setting a radius of monitoring by a wearable device or a smart phone by using a personal safety system. As illustrated in FIGS. 13 and 14, a user may not want to use all resources of a device connected to the personal safety system and thus may require more sophisticated configuration. For example, the user may want to use a smart watch as a heart rate sensor due to the condition of a battery or may use a camera built in a car to recognize the user's face so as to save fuel or power of the battery of the car. Detailed configuration as described below is to determine resources or sensors to be used as user safety factors later. In particular, such personal settings may help a user to manage a system and battery consumption. However, the system may identify whether selected default settings provide an inaccurate calculation due to limited access to other device sensors. Accordingly, when selected environment settings are extremely restricted, the system will announce this case through a pop-up menu. A function of monitoring radial values of all paired devices may be personalized in a personalized safety system.

Referring to FIG. 13, a first page 1310 for configuring connected devices may display a smart phone 1311, a smart watch 1312, and a smart car 1313 as a list of connected devices. A second page 1320 is displayed according to an input for electing the smart watch 1312.

The second page 1320 may display a connection protocol 1321, a foot step counter 1322, an activity tracker 1323, heart rate monitoring 1324, and sleep monitoring 1325 as a list of items for personalization of the smart watch 1312. A third page 1330 is displayed according to an input for selecting the heart rate monitoring 1324.

The third page 1330 may include an item for on/off setting of heart rate monitoring.

FIG. 14 illustrates a sample scenario for configuration of a monitoring radius in a smart phone according to an embodiment.

Referring to FIG. 14, a first page 1410 for configuring connected devices displays a smart phone 1411, a smart watch 1412, and a smart car 1413 as a list of connected devices. A second page 1420 is displayed according to an input for selecting the smart phone 1411.

The second page 1420 displays a monitoring speed 1421, a monitoring location 1422, a monitoring radius 1423, a focus level 1424, and a dangerous situation 1425 as a list of items of personalization of the smart phone 1411. A third page 1430 is displayed according to an input for selecting the monitoring radius 1423.

The third page 1430 may include a menu 1431 for setting a monitoring radius.

A sample scenario for registering social media in a personal safety system or removing social media from the personal safety system will be described with reference to FIGS. 15 and 16 below.

In embodiments, social media is used as one of the sources for determining an emotion factor and a surrounding event that may cause a user to act in a dangerous situation. Therefore, for this purpose, the present disclosure provides a way to configure integration. As illustrated in FIG. 15, when the user selects specific social media such as Facebook or Twitter, authentication may be performed according to an application programming interface (API) of a related social media. A popup screen containing content of a contract may be displayed on a screen of a smart phone and the validity of the user's account may be verified. Thereafter, a safety system may be automatically connected to. Furthermore, as described in FIG. 16, the user may remove registration removal settings through registration.

Figure 15:
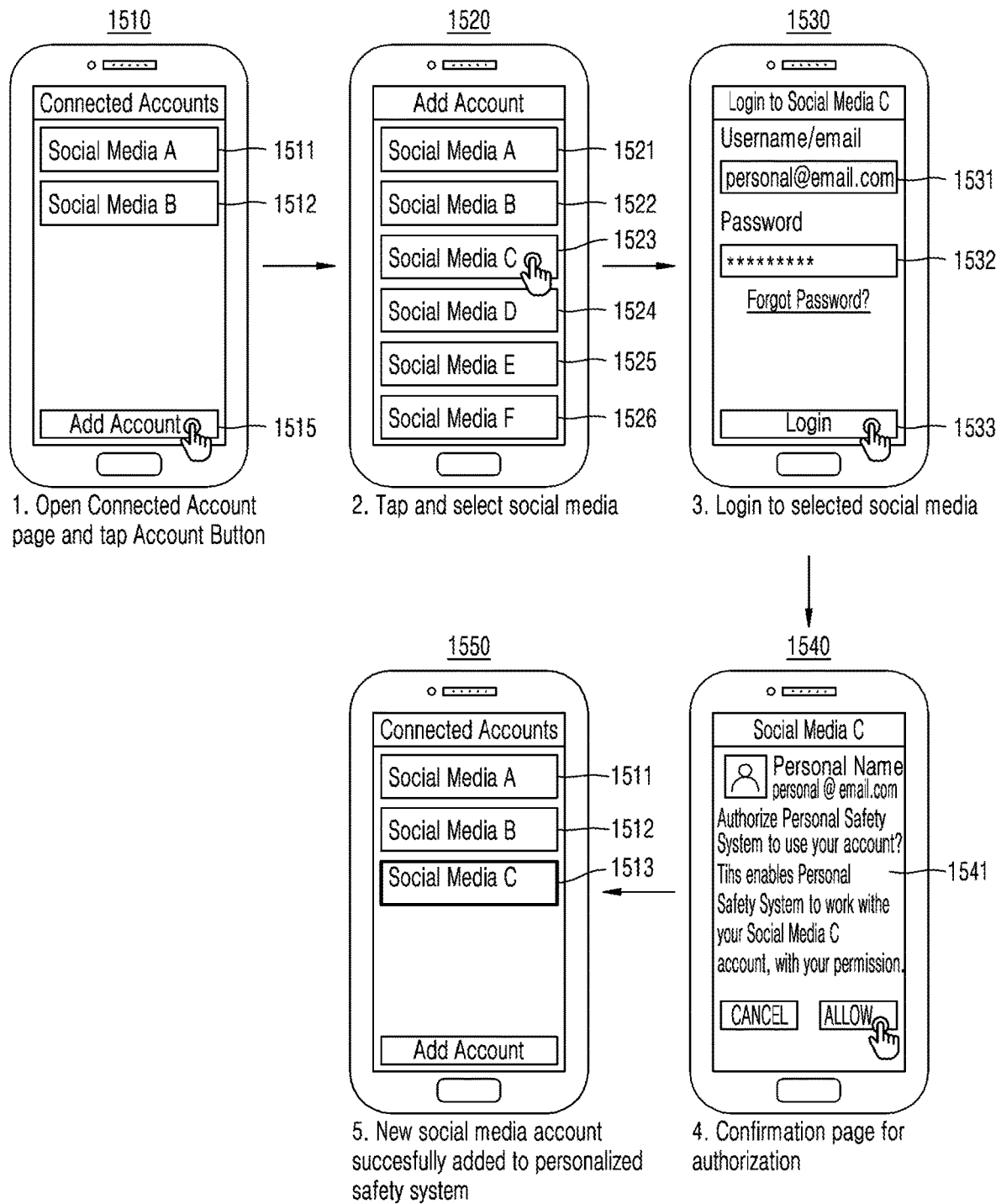
FIG. 15 illustrates a sample scenario for registration of social media in a personal safety system according to an embodiment.

FIG. 15 illustrates a sample scenario for registration of a social media in a personal safety system according to an embodiment.

Referring to FIG. 15, a first page 1510 for configuring connected accounts displays social media A 1511 and social media B 1512 as connected accounts. The first page 1510 further displays an 'add account' item 1515. A second page 1520 is displayed when a user selects the 'add account' item 1515.

The second page 1520 may display social media A 1521, social media B 1522, social media C 1523, social media D 1524, social media E 1525, and social media F 1526 as a list of accounts to be added. A third page 1530 is displayed when the user selects the social media C 1523.

The third page 1530 may include a menu for inputting a user name 1531 and a password 1532 to login to the social media C, and a login item 1533. A fourth page 1540 is displayed when the user selects the login item 1533.

The fourth page 1540 includes a message 1541 for confirming authentication for use of the personal safety system for an account of the social media C. A fifth page 1550 is displayed when authentication is permitted by the user.

As connected accounts, the fifth page 1550 may further display social media C 1513, as well as the social media A 1511 and the social media B 1512.

Figure 16:
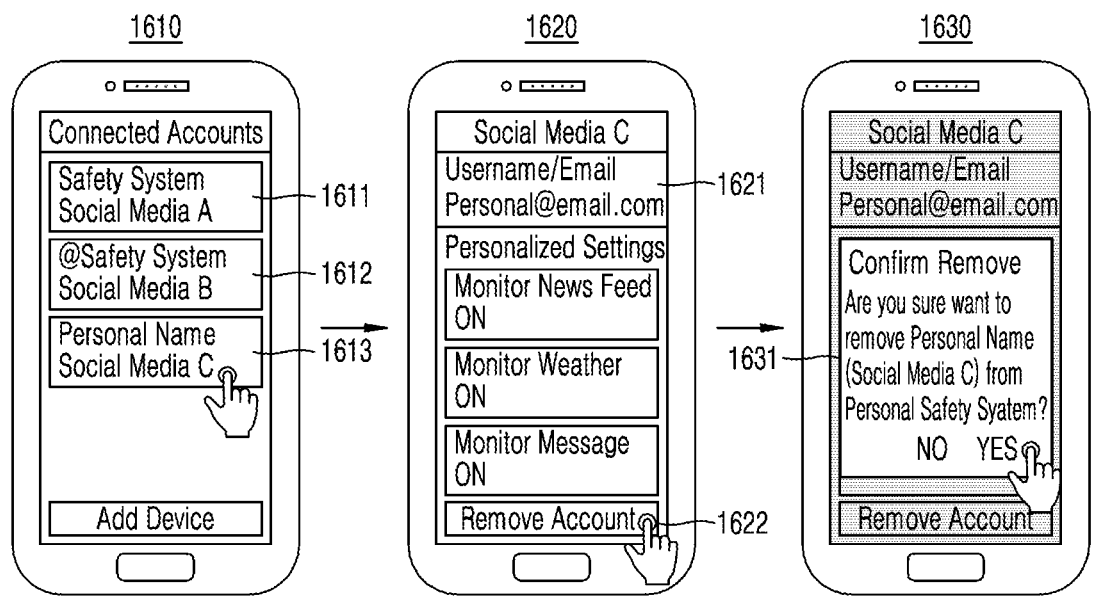
FIG. 16 illustrates a sample scenario for removing a social media account from a personal safety system according to an embodiment.

FIG. 16 illustrates a sample scenario for removing a social media account from a personal safety system according to an embodiment.

Referring to FIG. 16, a first page 1610 for configuring connected accounts displays social media A 1611, social media B 1612, and social media C 1613. A second page 1620 is displayed when a user selects the social media C 1613.

The second page 1620 includes one or more settings related to the social media C. The second page 1620 may further include a 'remove account' item 1622 for removing an account. A third page 1630 is displayed when the user selects the 'remove account' item 1622.

The third page 1630 includes a message 1631 for confirming removal of the social media C.

Figure 17:
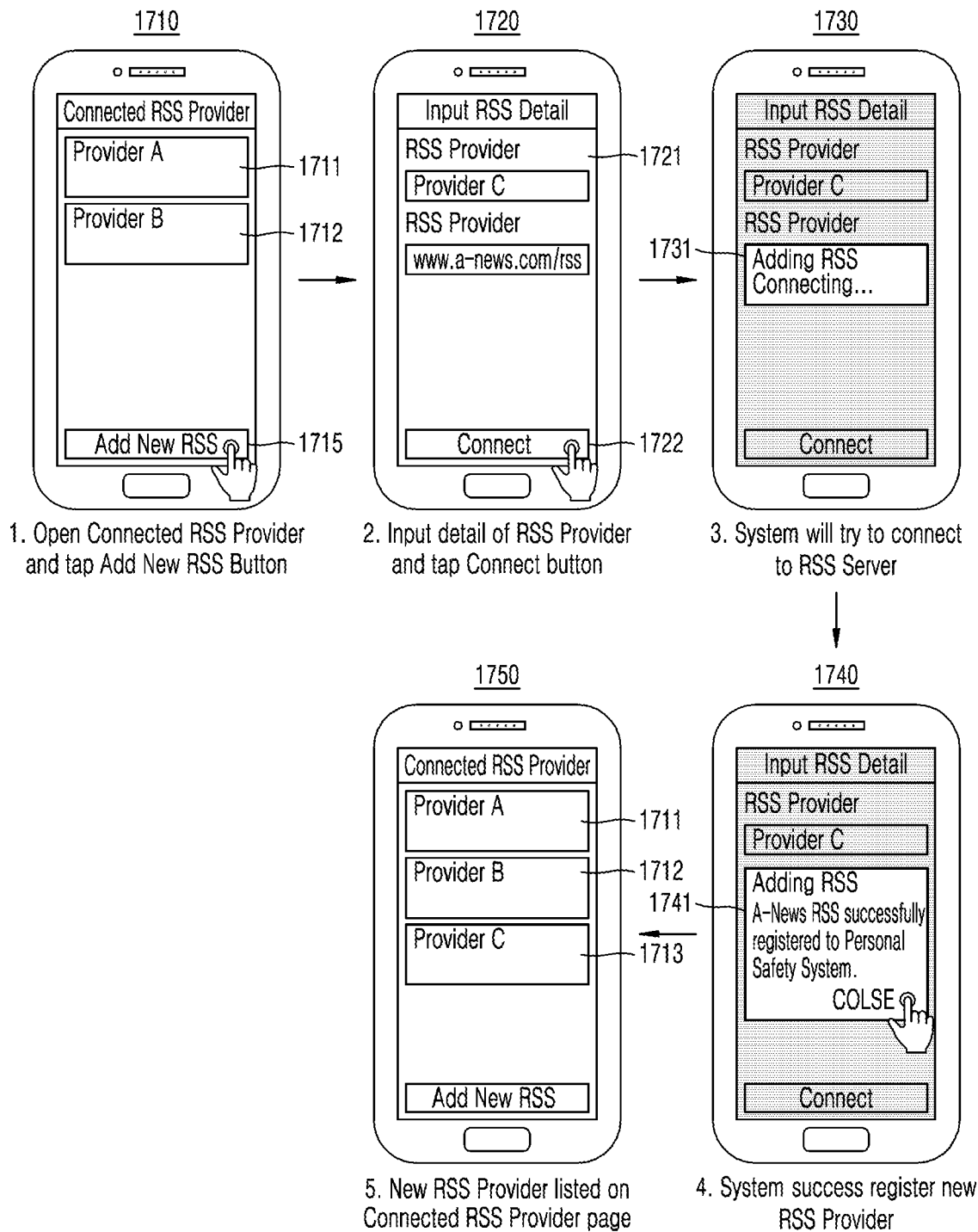
FIG. 17 illustrates a sample scenario for registration of a new RSS provider in a personal safety system according to an embodiment.

A sample scenario for registering an RSS provider in a personal safety system or removing an RSS provider from the personal safety system will be described with reference to FIGS. 17 and 18 below. As illustrated in FIG. 17, in order to register an RSS provider useful for identifying a surrounding event, according to the present disclosure, information provided from an online news portal site is used in domestic or international websites. New content may be obtained by accessing an online news API through an RSS feed, and a latest event occurring in a user's environment may be identified by processing text by a SoC. By adding one RSS feed, the user may be notified as soon as possible when he or she travels to a dangerous area in which there is a risk of bombs, floods, or tornadoes or in which traffic increases. The user may remove a registered RSS provider at any time.

FIG. 17 illustrates a sample scenario for registration of a new RSS provider in a personal safety system according to an embodiment.

Referring to FIG. 17, a first page 1710 for configuring connected RSS providers displays a provider A 1711 and a provider B 1712 as connected RSS providers. The first page 1710 may further display an 'add news provider' item 1715. A second page 1720 is displayed when a user selects the 'add news provider' item 1715.

The second page 1720 includes a menu 1721 for inputting a provider to be added, and a 'connect' item 1722. A third page 1730 is displayed when the user inputs a provider C and selects the 'connect' item 1722.

The third page 1730 displays a message 1731 informing that a system is attempting to connect to the provider C.

The fourth page 1740 displays a message 1741 informing that the system has successfully connected to the provider C.

As connected providers, the fifth page 1750 may further display provider C 1713, as well as the provider A 1711 and the provider B 1712.

Figure 18:
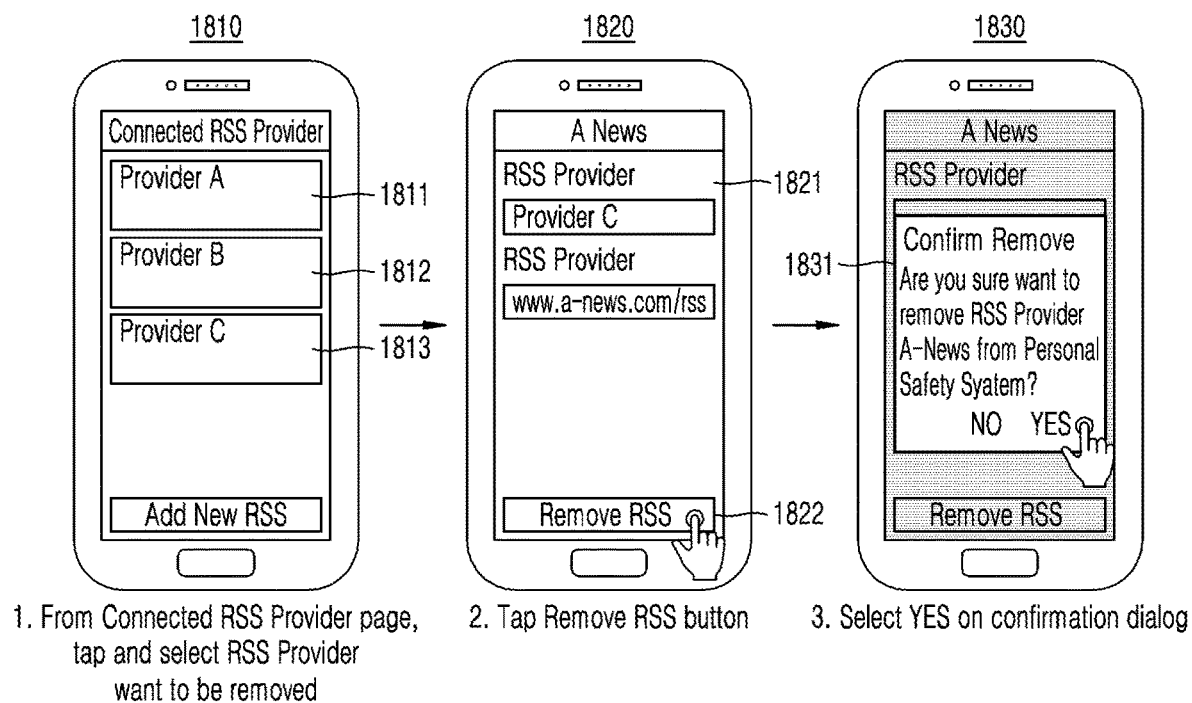
FIG. 18 illustrates a sample scenario for removing an RSS provider from a personal safety system according to an embodiment.

FIG. 18 illustrates a sample scenario for removing an RSS provider from a personal safety system according to an embodiment.

Referring to FIG. 18, a first page 1810 for configuring connected providers displays a provider A 1811, a provider B 1812, and a provider C 1813. A second page 1820 is displayed when a user selects the provider C 1813.

The second page 1820 may display a configuration 1821 related to the provider C and may further display a 'remove provider' item 1822 for removing the displayed social media C. A third page 1830 is displayed when the user selects the 'remove provider' item 1822.

The third page 1830 includes a message for confirming removal of the provider C.

Figure 19:
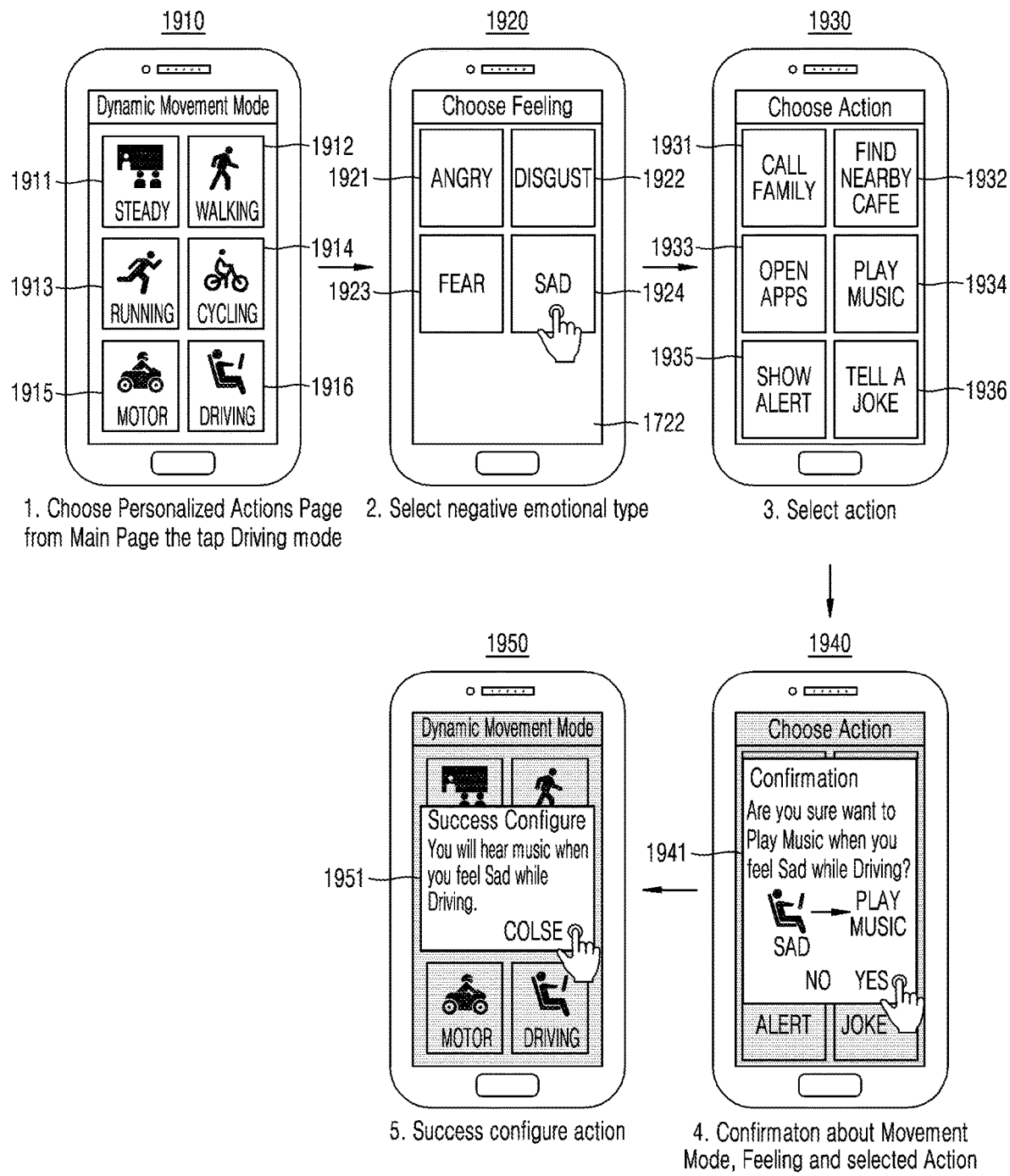
FIG. 19 is a sample scenario for configuration of a predetermined action according to an embodiment.

FIG. 19 is a sample scenario for configuring a predetermined action according to an embodiment.

One of the features of a system is to allow a user to configure a preference for actions taken after a negative emotional state of the user is detected while moving at high speeds.

Referring to FIG. 19, a first page 1910, which is one of the personalized action pages and which shows a dynamic motion mode, may display steady 1911, walking 1912, running 1913, cycling 1914, motor 1915, and driving 1916. A second page 1920 is displayed when a user selects the driving 1916.

The second page 1920 displays angry 1921, disgust 1922, fear 1923, and sad 1924 as a plurality of categories of emotions. A third page 1930 is displayed when the user selects the sad 1924.

The third page 1930 displays call family 1931, find nearby cafe 1932, open apps 1933, play music 1934, show alert 1935, and tell a joke 1936 as a plurality of actions. A fourth page 1940 is displayed when the user selects the play music 1934.

The fourth page 1940 displays a message 1941 for confirming configuration for the play music 1934 when the user's emotion corresponds to the sad 1924 during the driving 1916 selected by the user in the first page 1910. A fifth page 1950 is displayed when the user confirms the configuration for the play music 1934.

The fifth page 1950 includes a message 1951 indicating successful completion of the configuration of the action.

Figure 20:
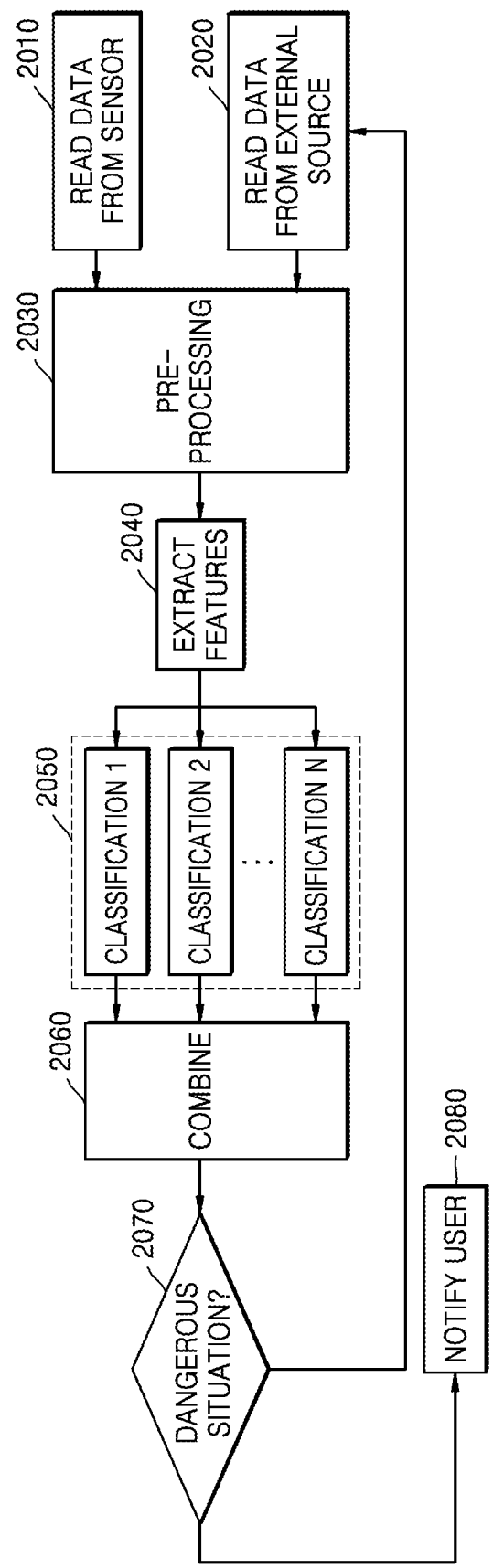
FIG. 20 is a flowchart of an ensemble learning calculation in a personal safety system according to an embodiment.

FIG. 20 is a flowchart of an ensemble learning calculation in a personal safety system according to an embodiment.

In the personal safety system, a program may be updated from an external system such as a computer and a smart phone. The personal safety system may provide an internal storage device so that the program may be used to store parameters of a mechanical learning calculation. The personal safety system may calculate a machine learning algorithm to classify dangerous situations in a user's environment. The present disclosure may implement ensemble learning which is one of the machine learning algorithms including pre-learning, and develop the ensemble learning in a SoC form. All machine learning algorithms may be designed and optimized in a SoC environment.

Referring to FIG. 20, the personal safety system reads data from a sensor device (operation 2010), and reads data from an external source, such as data disclosed by social media, data disclosed at a predefined website, or public data (operation 2020). Next, the personal safety system performs preprocessing on each input data (operation 2030), performs feature extraction (operation 2040), and performs classification using a classifier, based on extracted features (operation 2050). Next, the personal safety system is executed to detect an operation related to the program. For example, the personal safety system identifies whether there is a dangerous situation (operation 2070), and notifies a user of this fact when a dangerous situation is identified (operation 2080).

Figure 21:
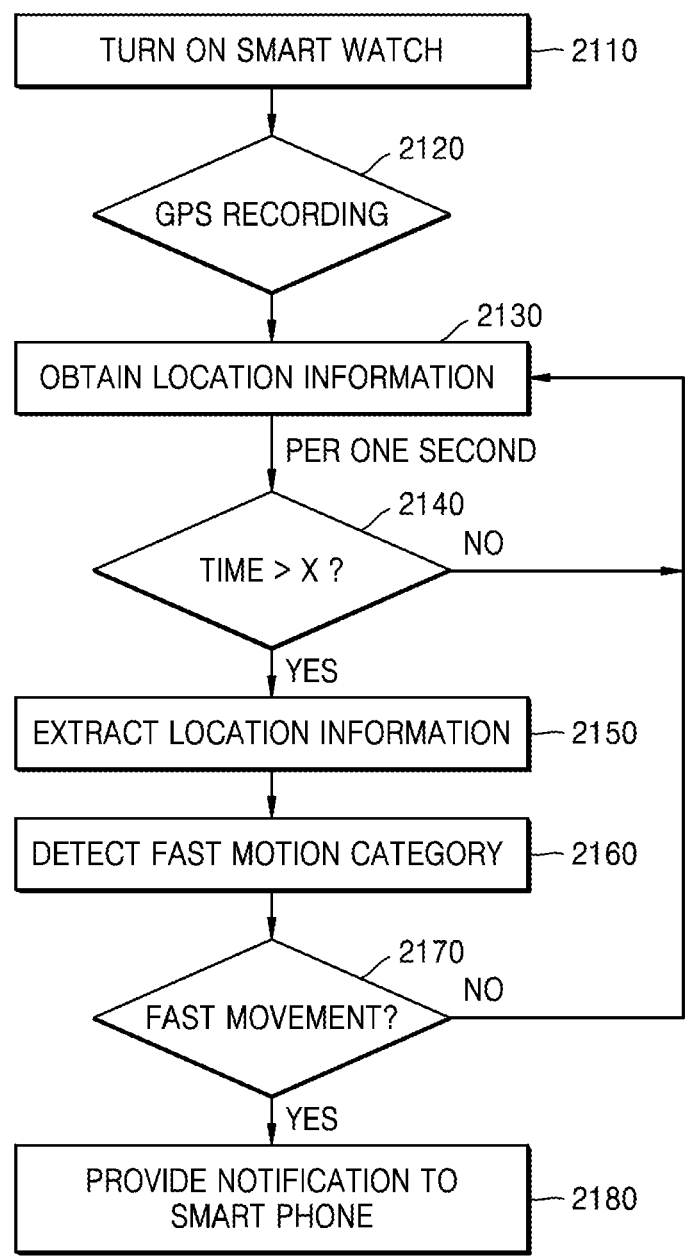
FIG. 21 illustrates a general overview of a system for recognition of a user's emotion according to an embodiment.

FIG. 21 illustrates a general overview of a system for recognition of a user's emotion according to an embodiment.

A personal safety system may be arranged in a smart monitoring device to identify a user's emotion.

Referring to FIG. 21, when the personal safety system is activated (operation 2110), a GPS of a smart watch obtains location information (operation 2130) by continuously recording a user's location every second until a specific time is reached (operation 2120). When records of the GPS reach a certain threshold X (operation 2140), data, including speed and user location information, is extracted (operation 2150). The speed is measured based on longitude and latitude changes per second, whereas the user's location may be obtained, for example, by identifying whether the user is on the road. Alternatively, an additional function of showing weather, day, and time may be added. The personal safety system may detect a fast motion category (operation 2160) and may provide a notification to a smart phone (operation 2180) when fast movement is identified (operation 2170). In FIG. 21, a dynamic motion mode including appropriate actions to be taken when the user has a negative emotion may include, for example, driving, running, cycling and motorcycling.

When the smart watch successfully shows the user's fast movement, various sensors of the smart watch, including 1) a heart rate measurement sensor, 2) a gesture sensor, 3) a gyroscope sensor, and 4) a pulse oximetry sensor, and audio recording, may be activated for a certain period of time. Records of the various sensors may transmitted to the smart phone after the records reach a threshold, and may be used to sense the user's emotion by an emotion recognition controller of the smart phone.

Figure 22:
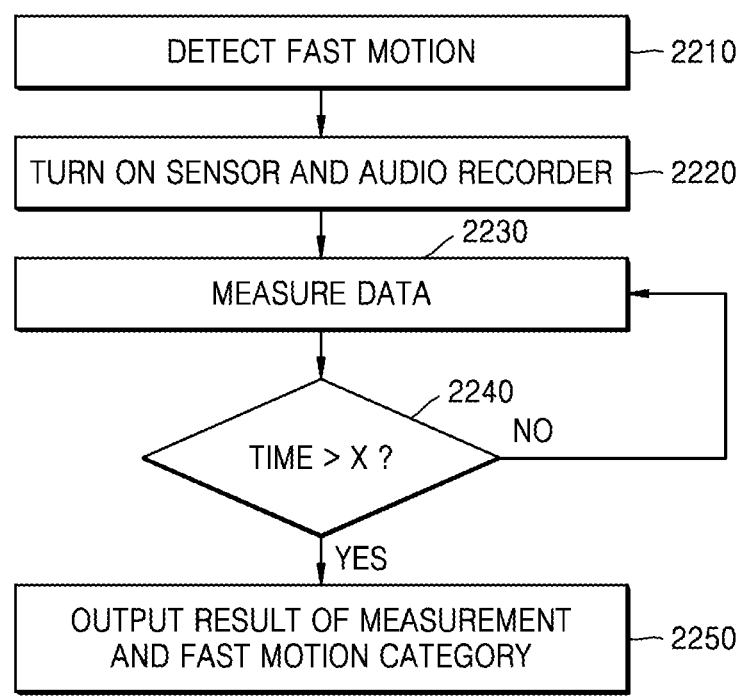
FIG. 22 is a flowchart of measurement of biological data by a wearable device, according to an embodiment.

FIG. 22 is a flowchart of measurement of biological data by a wearable device, according to an embodiment.

Referring to FIG. 22, a smart watch, which is one example of a wearable device, activates sensors and/or an audio recorder (operation 2220) when a fast motion is detected (operation 2210). Data is measured by the activated sensors and/or audio recorder (operation 2230). The sensors may include, for example, a heart rate measurement sensor, a gesture sensor, a gyroscope, a pulse sensor, etc. When X hours elapse after the measurement of the data (operation 2240), the smart watch may output a result of the measurement and a fast motion category to, for example, a smart phone (operation 2250).

As described above with reference to FIG. 22, a user's biological data may be collected by sensors of the user's smart watch and/or other sensor devices, whereas the user's social media data may be collected by a personal safety system installed in the smart phone. The personal safety system may access Twitter, Facebook, and a messaging application installed in the user's smart phone, and obtain three data categories including 1) text, 2) images, and 3) the user's activities before x hours.

Figure 23:
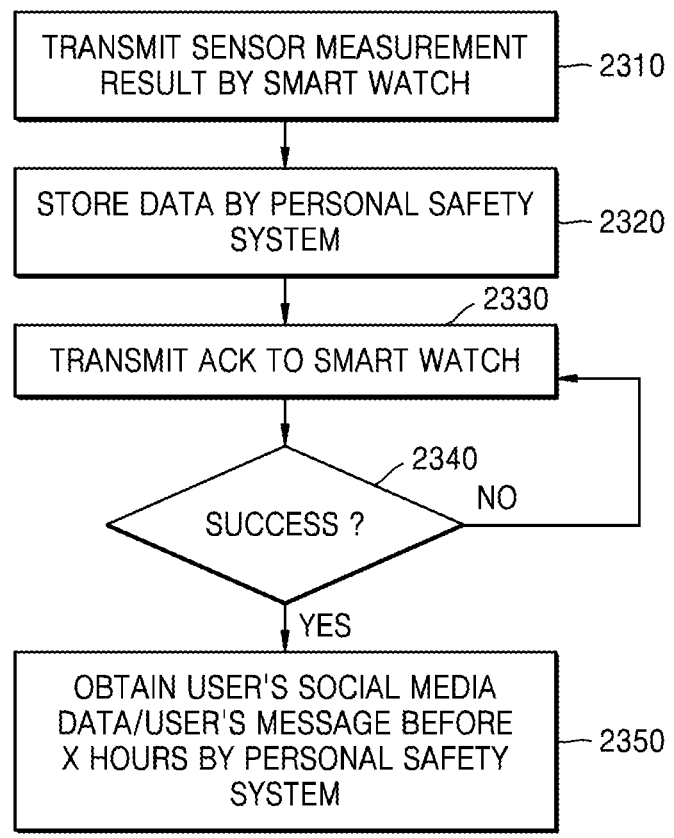
FIG. 23 is a flowchart of receiving a notification regarding a dynamic motion from a user's registered wearable device by a SoC of a safety system.

FIG. 23 is a flowchart of receiving a notification regarding a dynamic motion from a user's registered wearable device, the receiving of the notification being performed by a SoC of a safety system.

Referring to FIG. 23, when a smart watch transmits a sensor measurement result to a personal safety system (operation 2310), the personal safety system stores data of the sensor measurement result (operation 2320). Thereafter, the personal safety system may transmit an acknowledgement (ACK) to the smart watch (operation 2330).

When the ACK is successful (operation 2340), the personal safety system may obtain the user's social media data/the user's message before x hours (operation 2350). The social media data may include data of the user's action in a social media application such Twitter or Facebook, and the user's message may include data of the user's message in a messaging application. The social media data or the user's message may include text, images, the user's action, etc.

Figure 24:
FIG. 24 illustrates a sample scenario for detecting a user's dynamic motion by a wearable device, according to an embodiment.

FIG. 24 illustrates a sample scenario for detecting a user's dynamic motion by a wearable device, according to an embodiment.

When a result of detecting a dynamic motion indicates one of the above-described categories, a smart watch may automatically display the category on a screen. Referring to FIG. 24, the smart watch may display a driving category 2410, a cycling category 2420, a motorcycling category 2430, and a learning category 2440.

Figure 25:
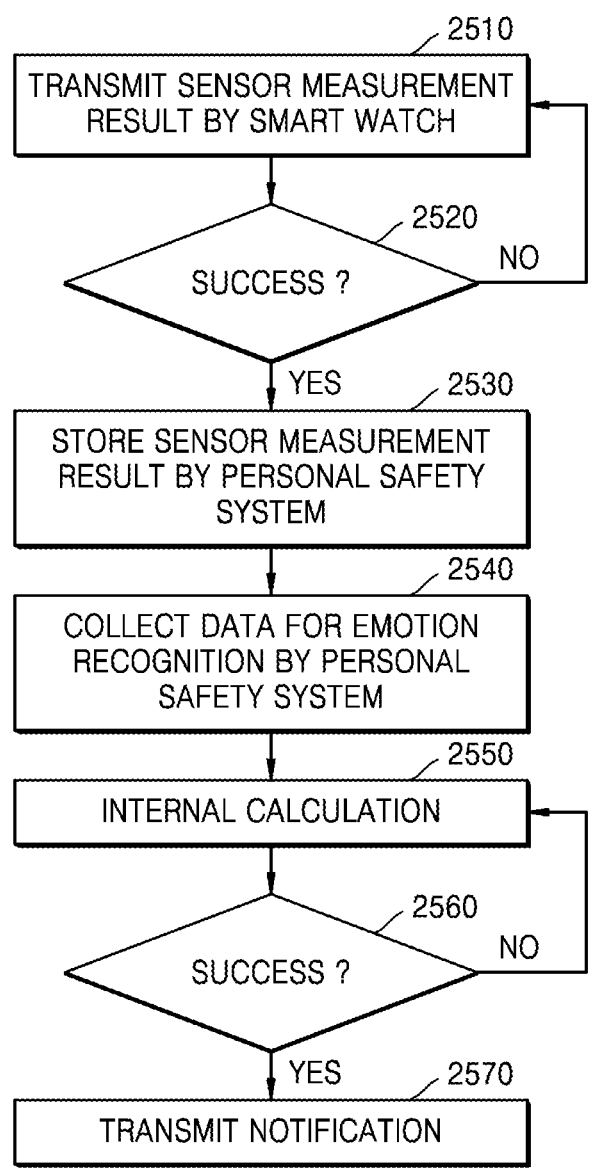
FIG. 25 is a flowchart of collecting all data regarding an emotion recognition system by a personal safety system, according to an embodiment.

FIG. 25 is a flowchart of collecting all pieces of data regarding an emotion recognition system by a personal safety system according to an embodiment.

Referring to FIG. 25, a smart watch transmits a sensor measurement result to a personal safety system (operation 2510), and the personal safety system may store data of the sensor measurement result (operation 2530) when the transmission of the sensor measurement result is successful (operation 2520). Next, the personal safety system collects data used for emotion recognition (operation 2540). The personal safety system performs an internal calculation (operation 2550) and may transmit a notification (operation 2570) when the internal calculation is successful (operation 2560).

The personal safety system may perform some actions when a result of emotion recognition indicates that a user is in a negative emotional state. For example, the personal safety system may prevent the user from being in danger due to a fast movement by taking one or more appropriate actions, such as notifying the user to stop moving or recreational activities. Alternatively, the personal safety system may transmit a warning when the result of emotion recognition indicates that the user's situation is not suitable for driving. Appropriate actions that may be taken by various devices with respect to four negative emotions according to various embodiments may be defined as follows.

TABLE 1

|  | Driving | Motor-cycling | Cycling | Running |
|---|---|---|---|---|
| Sad | Play happy music Suggestion to make a call to family | Tell something funny | Tell something funny | Play happy music |
| Angry | Give alert to stop Play instrument | Give alert to stop | Give alert to stop | Play fun music |
| Disgust | Show green pictures in smart watch smart car clean the air | — | — | — |
| Fear | smart car turn on the lamp (make the car brighter) | Tell something funny | Tell something funny | Play fun music |
| Not Focus | Giving alert to stop driving | Giving alert to stop | Giving alert to stop | — |

According to Table 1 above, the personal safety device may classify a user's motions into four categories, i.e., driving, motorcycling, cycling, and running, and classify the user's emotions into five categories, i.e., sadness, anger, disgust, fear, not-focused and determine actions corresponding to the five categories. For example, when the user's emotion while driving is sad, the personal safety device may determine playing happy music or making a call to family as an action.

Figure 26:
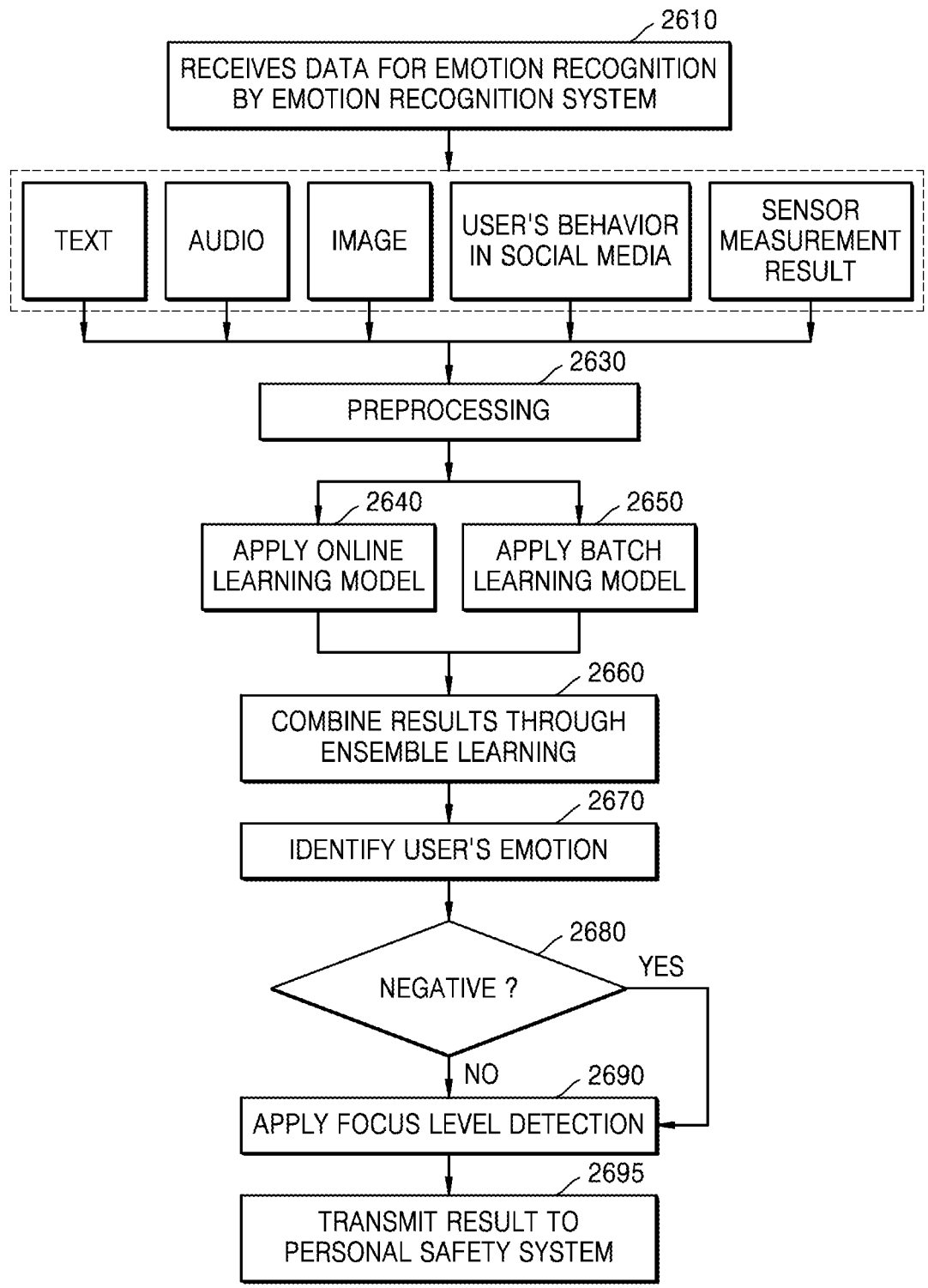
FIG. 26 is a flowchart of predicting a user's emotional state by an emotion recognition system according to an embodiment.

FIG. 26 is a flowchart of predicting a user's emotional state by an emotion recognition system according to an embodiment.

Referring to FIG. 26, when the personal safety system transmits data necessary for emotion recognition to an emotion recognition system, the emotion recognition system receives the data used for emotion recognition (operation 2610). The data used for emotion recognition may include, for example, one or more among text, audio, images, a user's action in social media, and a sensor measurement result.

The emotion recognition system may perform preprocessing on each type of data received (operation 2620). For example, text data may be cleaned through text cleaning including removal of special characters, normalization, and removal of stop words. Some signal processings may be performed to prepare feature extraction for the result of measurement by the sensors.

Next, the emotion recognition system extracts features, based on the preprocessed data (operation 2630). Because predetermined features are extracted from raw data, the user's emotional state may be predicted using a machine learning model. Two learning models may be applied in embodiments. One of the learning models is an online learning model 2640 for calculating data from sensors and audio data, and the other learning model is a batch learning model 2650 for processing text data.

Next, the emotion recognition system may identify the user's emotion (operation 2670) by combining results of the online learning model 2640 and the batch learning model 2650 through an ensemble learning approach method (operation 2660). When a result of identifying the user's emotion indicates a negative emotional state (operation 2680), the emotion recognition system transmits the result to the personal safety system (operation 2695). When the result of identifying the user's emotion does not indicate the negative emotional state (operation 2680), focus level detection may be applied to deeply examine the user's state even in a positive emotional state (operation 2690).

Previous research reveals that emotions may be classified by analyzing various elements such as text and voice. However, research has been conducted so far on emotion recognition by performing an intelligent system using separate elements such as text or speech. The present disclosure has proposed a combination of several elements including text, voice, the user's action in social media, images and the user's biological data. With this integrated approach, the emotion recognition system may provide a more reliable result in predicting a user's emotional states. Emotions are an expression of human psychological states and are divided into various categories. Well-known categories of emotions are defined by Plutchik and are referred to as Plutchik's wheel. Emotions defined by Plutchik include joy, trust, sadness, anger, surprise, fear, expectation, and disgust. As one example, emotions may be categorized into categories following Plutchik's definition. Accordingly, for example, there are four emotions indicating negative emotional states, e.g., sadness, anger, fear, and disgust.

A learning procedure generally performed in machine learning may be applied to construct an emotion recognition system incorporating various factors. An important issue is to define functions that have a significant influence on classification criteria and may provide higher accuracy to the system. The following shows some combinations of elements.

Text

It is clear that text is related to emotions. For example, "pleasant" or "tasty" represents an emotion of joy, "depressed" or "crying" represents sadness, and "screaming" or "boiling with rage" may represent anger. In embodiments, text data may be obtained through user social media data and messaging applications that contain a larger amount of unstructured data than that of general documents. Classification based on a vocabulary (word dictionary) may be preferred because it includes various acronyms or out-of-vocabulary (OOV) words that are not listed in a dictionary. Therefore, language identification is needed after a vocabulary-related technique is applied.

Table 2 above defines six sets of text functions as predictors for emotion recognition. Punctuation, vocabulary, and a set of emoticon are language-independent functions, and some of voice and emotional dictionary functions are extracted by first checking a language of a document (which varies according to a language).

Speech

Voice or audio information is generally easy to record but is difficult to learn. This is especially true when sound contains a large amount of filler and noise. In embodiments, this mechanism may be used to enrich information for emotion prediction. Speech preprocessing may produce low-filler and low-noise audio through signal processing. Feature extraction may be performed in various ways as shown in Table 3 below. One of the well-known procedures is based on the INTERSPEECH 2010 paralinguistic challenge configuration (IS10 Paralinguistic Features).

TABLE 3

| Descriptors | Functional |
| --- | --- |
| PCM loudness | Position max/min |
| MFCC[0-14] | arith. mean, std. deviation |
| long Mel Freq. Band[0-7] | skewness, kurtosis |
| LSP Frequency [0-7] | lin. Regression coeff |
| F0 | lin. Regression coeff |
| F0 Envelope | quartile 1/2/3 |
| Voicing Prob. | quartile range 2-1/3-2/3-1 |
| Jitter local | percentile 1/99 |
| Jitter consec. Frame pairs | percentile range 99-1 |
| Shimmer local | up-level time 75/90 |

Image

It is important to know that facial expressions primarily reflect people's visual emotions. Image processing performed in embodiments relates to use of images obtained through a user's social media and a messaging application which may be composed of human face images. Images illustrated in cited documents or any images reflecting a user's emotions are available. Some features applied to embodiments are shown in Table 4 below.

TABLE 4

| Set | Description |
| --- | --- |
| Colors[9] | RGB histogram/invariant color models |
| Texture [10] | Texture calculation according to image matrix |
| Intensity | Intensity calculation according to image |

TABLE 2

| Set | Attribute | List of Attribute | Description |
| --- | --- | --- | --- |
| Punctuation | 5 | Number of """, "?", ".", "," and special character | Number of corresponding punctuation in documents |
| Lexical | 6 | #letter, #lowercase, #uppercase, aggregate{min, max, avg} of #letter in word | The corresponding number of attributes |
| Part of speech | 8 | #noun, #verb, #adjective, #adverb, #pronoun | Number of corresponding POS tag in a document |
| Emotion | 1 | Emotion score | Increasing the score by +1 and −1 for positive and negative emoticon respectively, initiated by 0 |
| Emotion lexicon | 8 | joy, trust, sadness, anger, surprise, fear, disgust, anticipation | number of words that matches with corresponding emoticon class word list |

TABLE 4-continued

| Set | Description |
| --- | --- |
| Transform Features [11] | matrix (number of white or black) Wavelet sub-band, uniform sub-band, DCT, spatial partition, etc. |

Users' Behaviors in Social Media

Understanding not only emotion detection but also users' behaviors when connecting to social networking sites may improve interface design, do more research into social interaction, and improve the design of content distribution systems. In embodiments, this model is used to improve emotion recognition models. Users' behaviors in social media may be simply calculated from numbers, the number of posts, the number of times sharing, the total number of pages visited, a period, and the number of clicks.

Sensor Measurement Result

It is believed that biological data obtained by sensors may sharpen an emotion recognition system. In embodiments, the present inventors believe that various sensors may be used in an integrated manner as shown in Table 5 below.

TABLE 5

| Sensor | Description |
| --- | --- |
| Heart rate | The minimum, maximum and average of heart rate measurement |
| Gesture | Type of gesture |
| Gyroscope | the rate of rotation around a particular axis (velocity, movement) |
| Pulse of Oximetry | blood-oxygen saturation level pulse rate |

Figure 27:
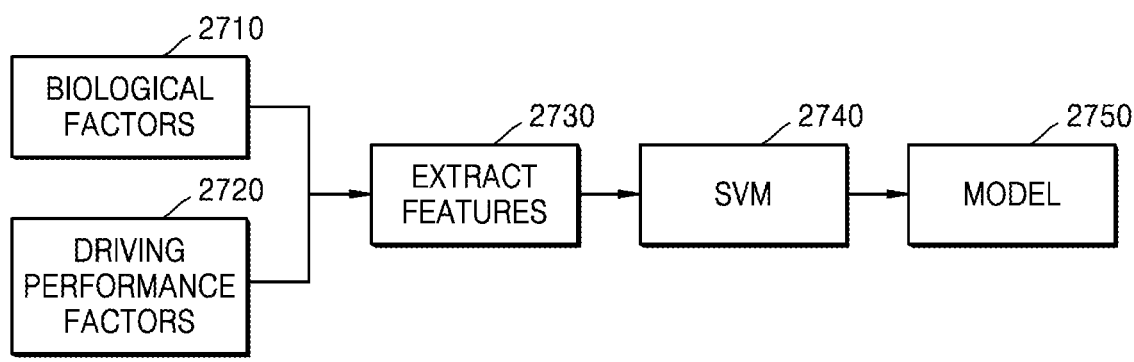
FIG. 27 is a flowchart of detecting a focus level according to an embodiment.

FIG. 27 is a flowchart of detecting a focus level according to an embodiment.

Focus level detection aims to identify a user's safe psychological state predicted as a positive emotional state. For example, a sleepy state or a drunken state that is not always associated with negative emotions may indicate lack of focus. Here, simple machine learning may be applied using some functions of a GPS and a speed of a vehicle to implement the system. Unfocused users usually drive a vehicle at irregular speeds. Thus these users may deviate from the road. Therefore, a user focus level may be achieved by taking account into account these factors. To simplify a process, user focus levels may be classified into two levels: a focused state and a non-focused state.

Referring to FIG. 27, an emotion recognition system may extract features (operation 2730), based on biological factors 2710, such as a heart rate and a blood oxygen saturation rate, and driving performance factors 2720. Driving performance may be measured by measuring a steering wheel angle, a lane position, and a steering error due to distortion of the steering wheel angle. In one embodiment, characteristics of motions of a driver's eyes may be replaced with predetermined biological factors, and features obtained from a GPS, such as vehicle performance and vehicle speed, may be added as a set of driving performance characteristics.

A focused state and a not-focused state may be classified by applying a support vector machine (SVM) 2740 to the emotion recognition system, based on the extracted features, and through a model 2750.

Figure 28:
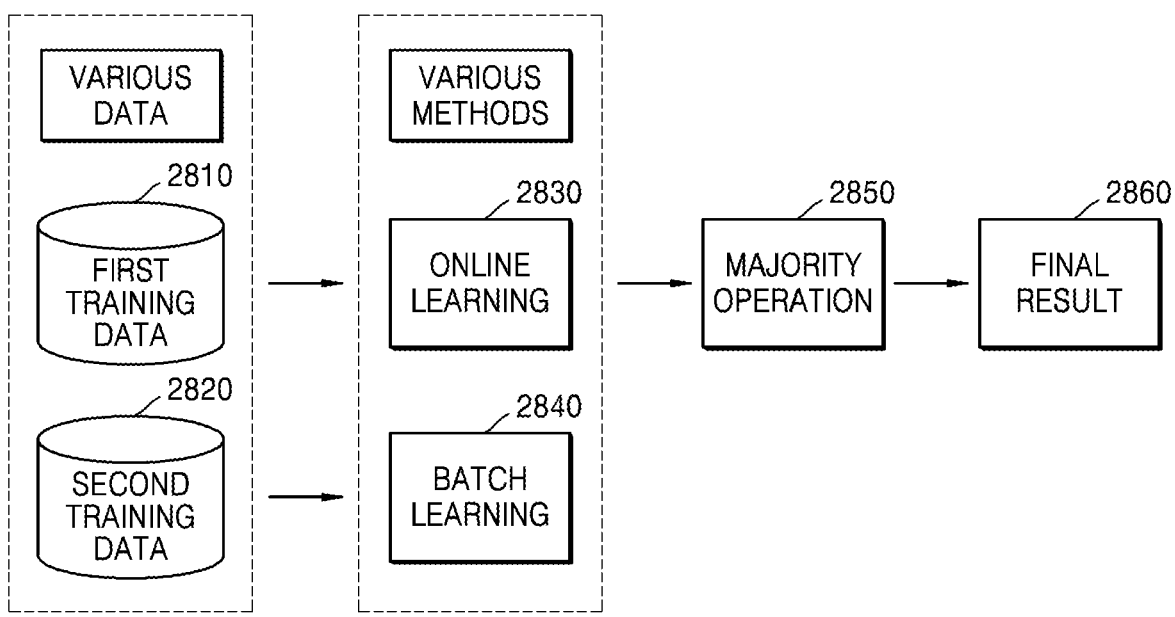
FIG. 28 is a flowchart of an online learning model according to an embodiment.

FIG. 28 is a flowchart of an online learning model according to an embodiment.

Online learning and batch learning are two approaches that bring about two machine learning models. In order to make one final decision, two machines should be integrated, and an ensemble learning method is a well-known technique therefor. There are two main approaches to design ensemble learning algorithms. The first approach is to independently form hypotheses, based on that a set of hypothesis results is accurate and diverse. That is, although the hypotheses have a low error rate that is reasonable to make new predictions but do not agree with many predictions. When an ensemble of the hypotheses can be formed, the ensemble may be more accurate than any of the component classifiers. This is because the inconsistency will be "offset". The second approach is to design an ensemble by forming hypotheses in a combined fashion such that a majority of the hypotheses match data.

An appropriate approach to the present disclosure may be the second approach, because the online learning algorithm and the batch learning algorithm are two different learning methods. In embodiments, a subset of data is not used to form various hypotheses such as the first approach, or data sources with different learning methods are used. To implement ensemble learning of the present disclosure, a majority operation may be performed by adding all weights predicted for each of the categories of emotions created using a model. Thus, a final output of a user's emotional state is emphasized in the majority operation.

Referring to FIG. 28, various methods including online learning 2830 and batch learning 2840 may be applied to various data including first training data 2810 and second training data 2820, and a final result 2860 may be output through a majority operation 2850.

FIG. 29 is a sample scenario of an alarm of a smart car system according to an embodiment.

A notification according to the present disclosure is emphasized as a self-discovery notification system. A smart notification system allows a SoC to identify an appropriate situation and a device to warn a user. When a user suddenly receives a warning in an inappropriate situation, the user may try to avoid the situation that causes fear. For example, while a user is driving a car, the SoC may be better to transmit a notification to a smart watch instead of a smart phone. Alternatively, it may be more appropriate for the user to receive the notification via a smart car screen.

Referring to FIG. 29, in 2910, a personal safety system inside or outside a smart car may identify the speed 2911 of the smart car, a user's emotion 2912, a focused/not-focused state 2913, and the weather 2914, and output a message of "Smart car will turn on fog lamp" according to an action based on a result of the identification.

In 2920, the personal safety system inside or outside the smart car may identify the speed 2921 of the smart car, the user's emotion 2922, a focused/not-focused state 2923, and the weather 2924, and display a message 2925 of "Please stop" according to an action based on a result of the identification.

Figure 30:
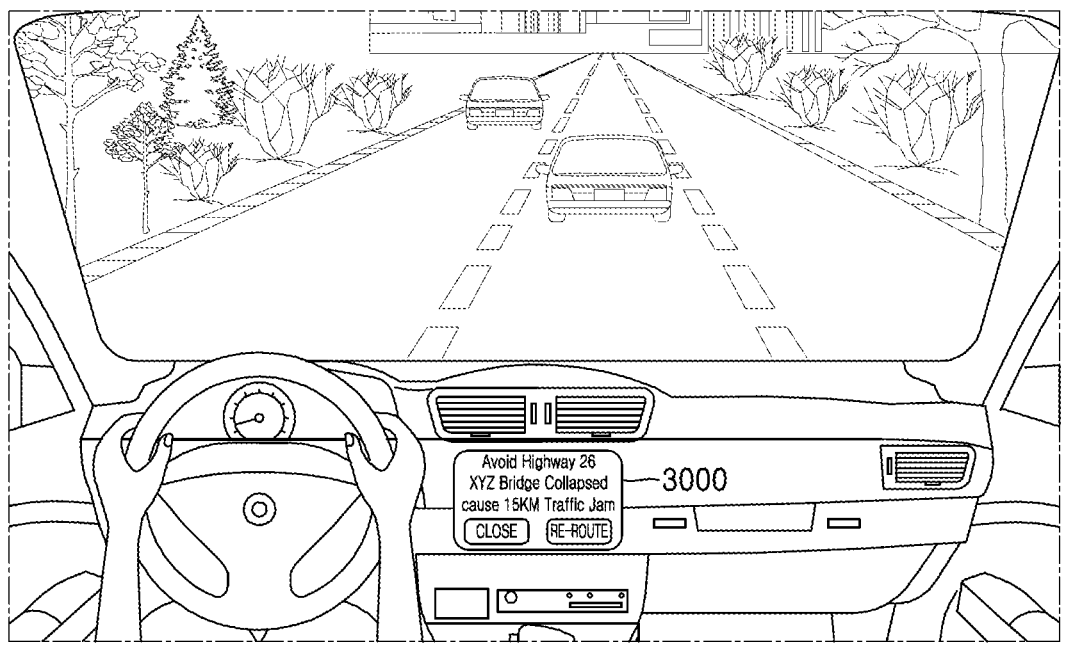
FIG. 30 is a sample scenario of a notification alarm of a smart car according to an embodiment.

FIG. 30 is a sample scenario of a notification alarm of a smart car according to an embodiment.

The present disclosure is easy to be integrated with other nearby devices. When an emergency occurs, devices implementing a SoC may communicate with each other to warn people of a dangerous event. Nearby devices may be a bulletin board screen or a user device implementing a security system of the present disclosure.

Referring to FIG. 30, by communicating with a nearby device implementing a personal safety system, a user's smart car may receive an alarm from the nearby device and display a message 3000 of "There is a 15 km traffic jam due to the collapse of the XYZ Bridge. Avoid Highway 26".

Figure 31:
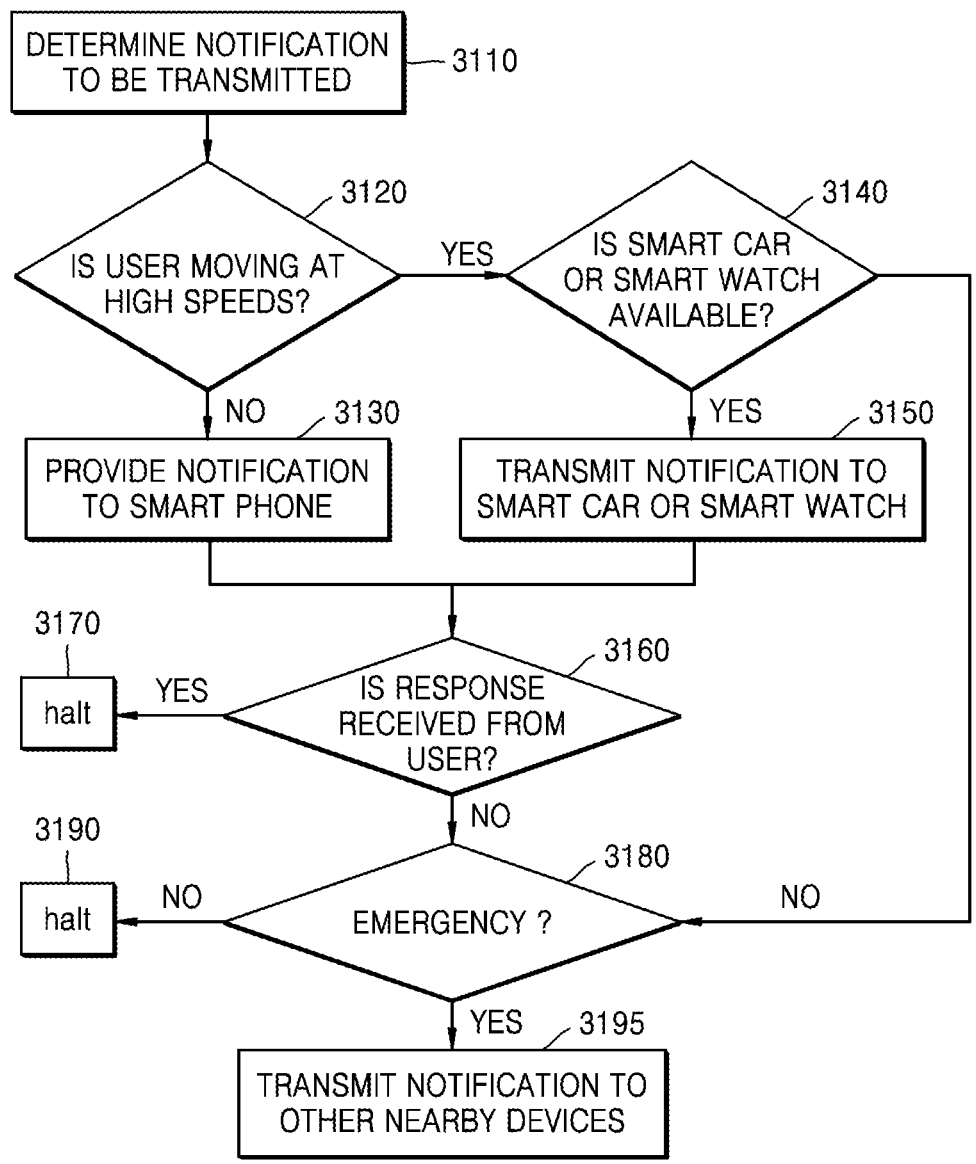
FIG. 31 is a flowchart of a notification model according to an embodiment.

FIG. 31 is a flowchart of a notification model according to an embodiment.

Referring to FIG. 31, when it is determined that a notification is to be transmitted (operation 3110), a personal safety system identifies whether a user is moving at high speeds (operation 3120). When it is determined that the user is not moving at high speeds, the personal safety system may determine to notify a smart phone (operation 3130).

When it is determined that the user is moving at high speeds, the personal safety system identifies whether a smart car or a smart watch is available (operation 3140). That is, when the user is moving at high speeds, it is difficult for the user to check the smart phone and thus it is determined whether or not a device other than the smart phone is available. When the smart car or the smart watch is not available, it proceeds to 3180. When the smart car or the smart watch is available, the notification is transmitted to the smart car or the smart watch (operation 3150).

Next, it is determined whether a response is received from the user (operation 3160), and when a response is received from the user, the process is stopped (operation 3170).

When no response is received from the user, it is determined whether or not there is an emergency (operation 3180), and when it is determined that there is no emergency, the process is stopped (operation 3190). In the case of an emergency, the notification may be transmitted to other nearby devices (operation 3195). In the case of a particularly serious notification regarding, for example, a tornado, a natural disaster, or a crime happening in the vicinity, it is important to receive a response from the user. For example, when a response to an emergency notification transmitted to the smart watch or the smart car is not received from the user, the personal safety system may transmit a broadcast notification to other nearby devices to protect the user from a danger.

Figure 32:
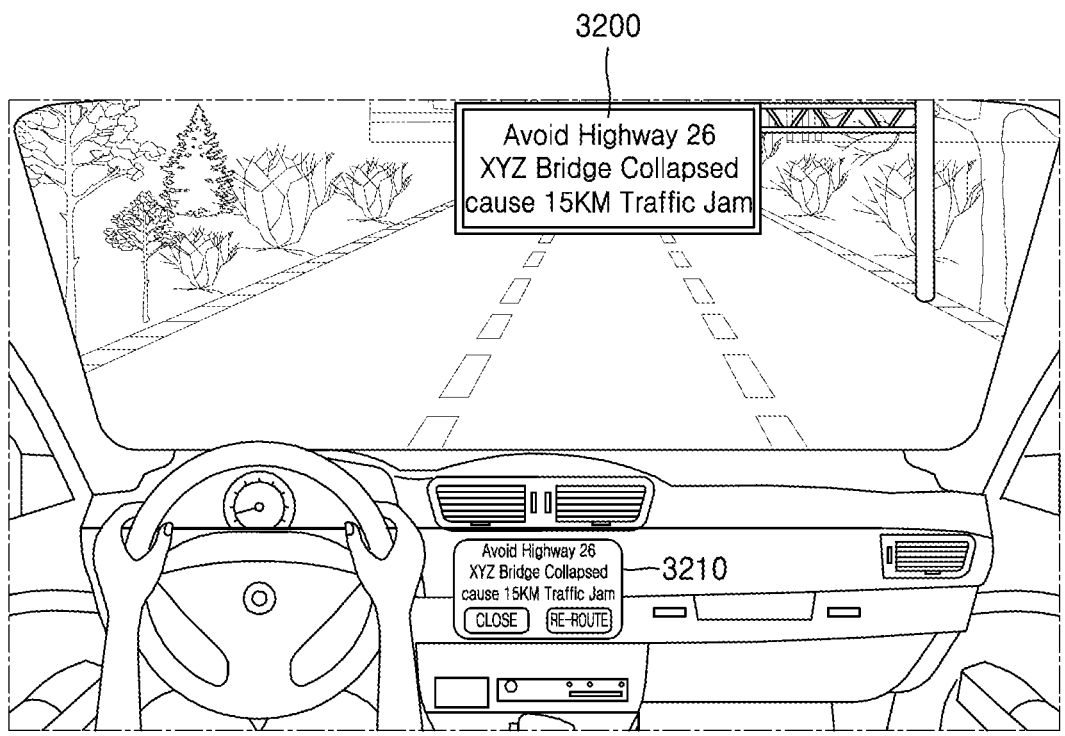
FIG. 32 illustrates an example in which a notification is transmitted to a peripheral device according to an embodiment.

For example, in a smart city concept, a second alert notification may be displayed on an electronic billboard 3200 as illustrated in FIG. 32. For example, a personal safety system may display a message of "There is a 15 km traffic jam due to the collapse of the XYZ Bridge. Avoid Highway 26" not only on a display 3210 installed in the smart car but also on an electronic bulletin board 3200 near the vicinity of the user's car.

Figure 33:
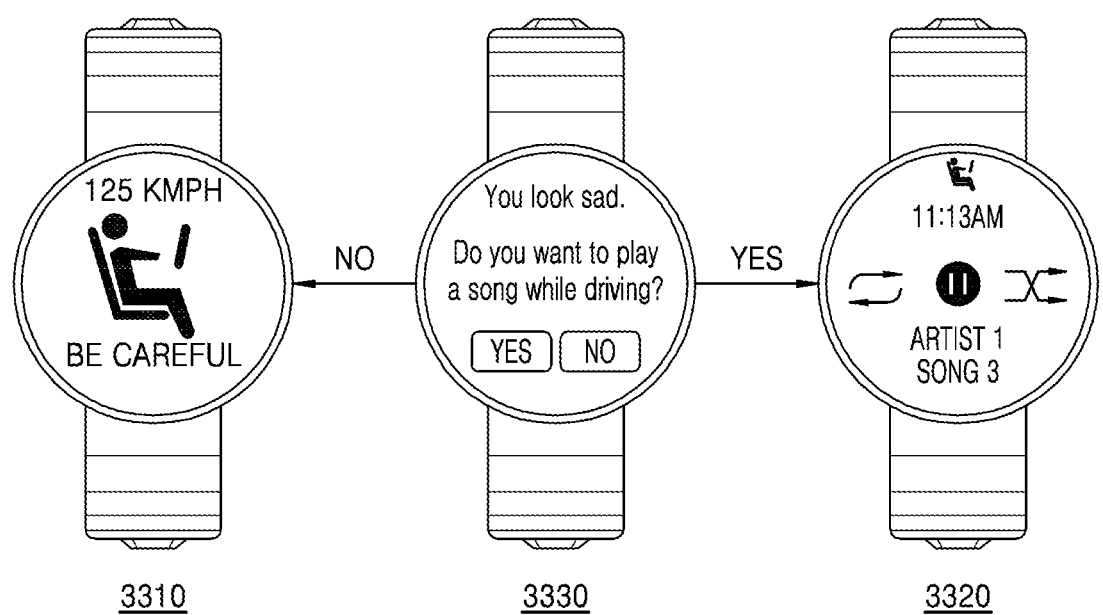
FIG. 33 is a sample scenario of re-storing a negative emotion result by an emotion recognition system according to an embodiment.

FIG. 33 is a sample scenario of re-storing a negative emotion result by an emotion recognition system according to an embodiment.

A user's psychology is classified as a positive or negative emotional state through emotion recognition. When the user's psychology is classified as the negative emotional state, the negative emotional state is classified as sadness, anger, fear, or disgust. In embodiments, an appropriate action is provided based on the user's current emotional state to help heal the user's heal negative emotion.

For example, a sad driver may be suggested to play a happy song while driving. Referring to FIG. 33, a smart watch may display a popup question 3300 "You look sad. Do you want to listen to a song while driving?" on a screen thereof. When the user selects a "No" option, a warning 3310 may be displayed directly on the smart watch as illustrated in FIG. 33. In contrast, when a "Yes" option is selected, a song 3320 may be played in one of the user's devices, which may be a smart phone, a smart watch, or a smart car.

In embodiments, the emotion recognition system is activated when a user's fast movement is detected as described above. By providing a result of the emotion recognition to a personal safety system, the personal safety system may perform a certain action when the result shows that the user is in a negative emotional state. The personal safety system may take one or more appropriate actions, such as notifying that the user should stop moving or recreating activities, to heal the user's negative emotion that may put the user at risk when the user is moving fast. Alternatively, when the result shows that the user is not at a level suitable for driving, the personal safety system may warn the user to stop driving.

Figure 34:
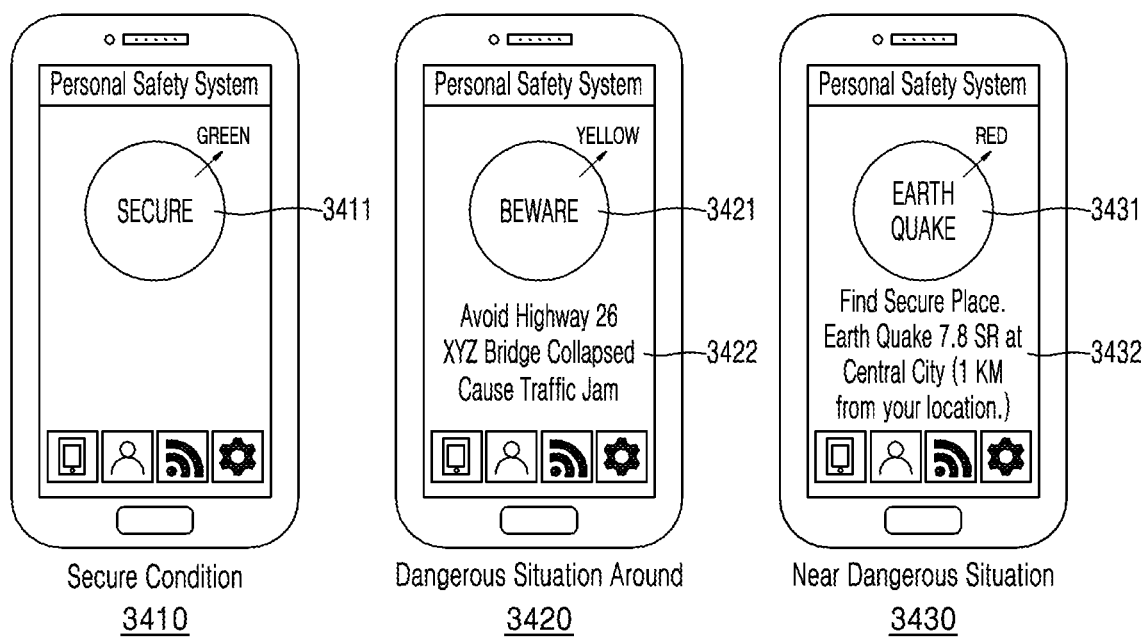
FIG. 34 is a sample scenario of a personal safety dashboard according to an embodiment.

FIG. 34 is a sample scenario of a personal safety dashboard according to an embodiment.

In embodiments, a personal safety system may classify dangerous situations in a user's environment by calculating internal user data user collected from a sensor device such as a GPS detecting a user's position, external data from social media, and public data for detecting dangerous or harmful events. When a result of the calculation indicates that there is a dangerous situation to the user, a personal safety dashboard may warn the user of a nearby dangerous event, as illustrated in FIG. 34.

Referring to FIG. 34, in 3410, the personal safety system may display a message 3411 of "SECURE" in green to indicate that the user is safe. In 3420, the personal safety system may display a message 3421 of "BEWARE" in yellow, along with a message 3422 informing that the collapse of the XYZ Bridge has caused a traffic jam and thus Highway 26 should be avoided. In 3430, the personal safety system may display a message 3431 of "EARTHQUAKE" in red, along with a message 3432 informing that an earthquake has occurred and thus you need to go to a safe place.

Figure 35:
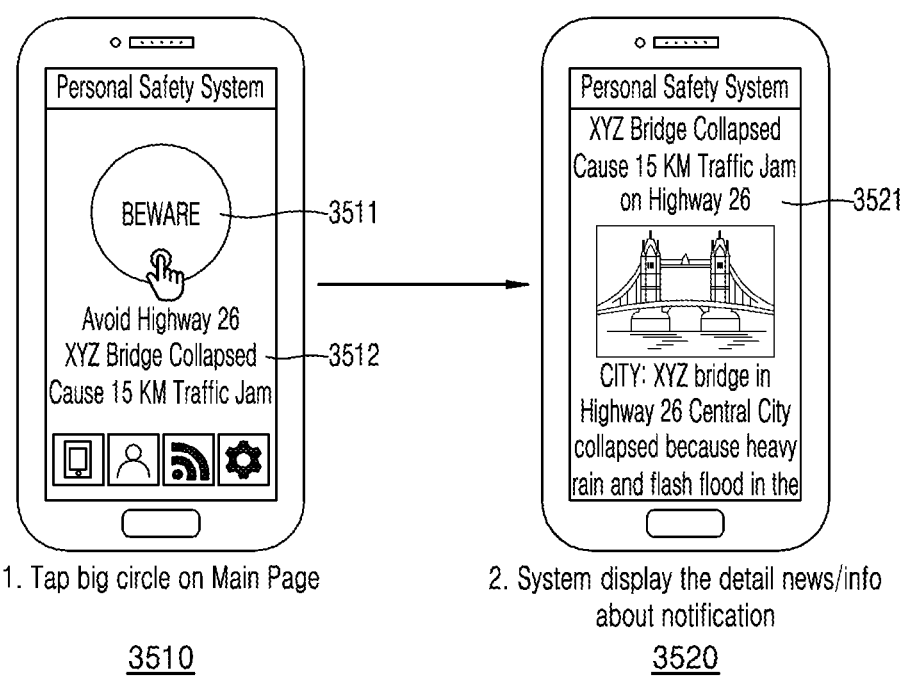
FIG. 35 is a sample scenario of displaying detailed information of a notification by a system according to an embodiment.

FIG. 35 is a sample scenario of displaying detailed information of a notification by a system according to an embodiment.

When a dangerous situation has occurred nearby, a personal safety system may notify a user of the details of the dangerous situation and alternate routes to avoid the dangerous situation.

In 3510, the personal safety system may display a message 3511 of "BEWARE" along with a message 3512 informing that the collapse of the XYZ Bridge has caused a traffic jam and thus Highway 26 should be avoided. When the user selects the message 3511 of "BEWARE", the personal safety system may display detailed news or information 3521 regarding the collapse of the XYZ Bridge.

According to embodiments, a safety system based on a SoC-based intelligent method may be developed to prioritize a user's safety in a dynamic environment while maintaining the user's privacy.

A main function of a central intelligent personal safety system which includes various modules with specific functions, such as an MCU, RAM for storing programs and data, a network module, and GPIO expansion is to use a SoC.

A user's state and a dynamic environment may be predicted by applying a variety of recognition technologies to text, audio data, images, or vision.

Ensemble learning, which is a combination of an online learning model and a batch learning model optimized for SoC environments, may be applied.

While the user is using a personal safety system, the user may manage and configure the personal safety system according to his or her preference.

Next, the present disclosure may be implemented independently or with a stand-alone system to perform all activities related to personal safety in two ways. The system may be embedded in various user devices, such as a smart phone, a wearable device, a general embedded board device or other IoT devices. A user's physical environment may be sensed by integrating the system with a user-defined board device and adding an external sensor device thereto.

Methods of operating a personal safety device according to embodiments may be implemented in the form of a program instruction executable through various computer means and recorded on a computer-readable recording medium. The computer-readable recording medium may include program instructions, data files, data structures, and the like solely or in combination. The program instructions recorded on the computer-readable recording medium may be specially designed and configured for the present disclosure or be well known to and usable by one of ordinary skill in the art of computer software. Examples of the computer-readable recording medium include magnetic media (e.g., hard disks, floppy disks, and magnetic tapes), optical media (e.g., CD-ROMs and DVDs), magneto-optical media (e.g., floptical disks), and hardware devices specially configured to store and execute program instructions (e.g., ROMs, RAMs, and flash memories). Examples of program instructions include not only machine language code prepared by a compiler, but also high-level language code executable by a computer by using an interpreter.

While embodiments have been described above in detail, the scope of the present disclosure is not limited thereto and is to cover all changes and modifications made in the embodiments by those of ordinary skill in the art, based on the basic concept of the present disclosure defined in the following claims.

The invention claimed is:

1. A personal safety device comprising:
    a communication interface;
    a memory storing at least one instruction; and
    a processor configured to execute the at least one instruction to:
        obtain personal online activity of a user, the personal online activity of the user being obtained from at least one of: a social media service, a messaging service, or a Really Simple Syndication (RSS) service;
        identify a current emotion of the user based on the obtained personal online activity,
        determine, based on obtained movement information, whether the user is driving in a speed category while the current emotion is a predefined emotion; and
        based on determining that the current emotion of the user is the predefined emotion occurring while the user is driving in the speed category, perform a action corresponding to the predefined emotion occurring while the user is driving in the speed category, from among a plurality of actions stored in the memory, wherein the memory further stores predefined emotions in association with the plurality of actions such that different predefined emotions are associated with different actions.

2. The personal safety device of claim 1, wherein the processor is further configured to execute the at least one instruction to:
    obtain biological environment information of the user from biological data of the user detected by one or more sensors; and
    identify a physical condition of the user, based on the user's biological environment information.

3. The personal safety device of claim 1, wherein the action comprises at least one of outputting an image, outputting a warning, outputting an audio signal, or controlling an Internet-of-things device.

4. The personal safety device of claim 1, wherein the processor is further configured to perform the action by transmitting information to a personal device of the user or a peripheral device around the user, which is capable of being controlled by the user.

5. The personal safety device of claim 1, wherein the processor is further configured to customize, by the user, the action, and an electronic device to perform the action.

6. The personal safety device of claim 1, wherein the personal safety device is embodied on a system-on-chip.

7. An operating method of a personal safety device, the operating method comprising:
    obtaining personal online activity of a user, the personal online activity of the user being obtained from at least one of: a social media service, a messaging service, or a Really Simple Syndication (RSS) service;
    identifying a current emotion of the user based on the obtained personal online activity;
    determining, based on obtained movement information, whether the user is driving in a speed category while the current emotion is a predefined emotion; and
    based on determining that the current emotion of the user is the predefined emotion occurring while the user is driving in the speed category, performing as action corresponding to the predefined emotion occurring while the user is driving in the speed category, from among a plurality of actions stored in the memory, wherein the operating method further comprises storing predefined emotions in association with the plurality of actions such that different predefined emotions are associated with different actions.

8. The operating method of claim 7, further comprising:
    obtaining biological environment information of the user from biological data of the user detected by one or more sensor; and
    identifying a physical condition of the user, based on the user's biological environment information.

9. The operating method of claim 7, wherein the performing the action comprises at least one of outputting an image, outputting a warning, outputting an audio signal, or controlling an Internet-of-things device.

10. The operating method of claim 7, wherein the performing of the action includes performing the action by personal device of the user or a peripheral device around the user, which is controllable by the user.

11. The operating method of claim 7, further comprising:
    customizing the action, and an electronic device to perform the action by the user.

12. A non-transitory computer-readable recording medium storing a program for executing the method of claim 7 in a computer.

* * * * *